(12) United States Patent
Takemoto et al.

(10) Patent No.: US 9,715,091 B2
(45) Date of Patent: Jul. 25, 2017

(54) ZOOM LENS AND IMAGE PICKUP APPARATUS INCLUDING THE SAME

(71) Applicant: CANON KABUSHIKI KAISHA, Tokyo (JP)

(72) Inventors: Shoichi Takemoto, Saitama (JP); Tomoyuki Nakamura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 134 days.

(21) Appl. No.: 14/048,159

(22) Filed: Oct. 8, 2013

(65) Prior Publication Data

US 2014/0104467 A1   Apr. 17, 2014

(30) Foreign Application Priority Data

Oct. 16, 2012   (JP) .................................. 2012-228696

(51) Int. Cl.
  *G02B 15/14*   (2006.01)
  *G02B 15/173*  (2006.01)
(52) U.S. Cl.
  CPC ........... *G02B 15/14* (2013.01); *G02B 15/173* (2013.01)
(58) Field of Classification Search
  CPC ............................. G02B 15/14; G02B 15/173
  USPC ................... 359/746, 764, 767, 676, 683
  See application file for complete search history.

(56) References Cited

U.S. PATENT DOCUMENTS

| 4,874,231 | A  | 10/1989 | Aono |
| 5,917,658 | A  | 6/1999  | Yamanashi |
| 7,821,723 | B2 | 10/2010 | Toyama |
| 7,982,970 | B2 | 7/2011  | Wada |

(Continued)

FOREIGN PATENT DOCUMENTS

| JP | 01126614 A  | 5/1989 |
| JP | 08234105 A  | 9/1996 |
| JP | 2009128492 A | 6/2009 |

(Continued)

OTHER PUBLICATIONS translation of JP2012063661, of record.*

(Continued)

*Primary Examiner* — Jordan Schwartz
*Assistant Examiner* — George G King
(74) *Attorney, Agent, or Firm* — Rossi, Kimms & McDowell LLP

(57) ABSTRACT

A zoom lens, including, in order from object side: a positive first unit which is fixed during zooming; a negative second unit which moves for zooming; a positive third unit which moves for zooming; a positive fourth unit which moves for zooming; and a positive fifth unit which is fixed during zooming, in which 1.50<LN(Z2)/LN(Z34)<2.30 and 0.70<f34w/f34t<0.96 are satisfied, where LN(Z2) is natural logarithm of Z2 obtained by dividing a lateral magnification β2t of the second unit at telephoto end by a lateral magnification β2w at wide angle end, LN(Z34) is natural logarithm of Z34 obtained by dividing a combined lateral magnification β34t of the third unit and the fourth unit at telephoto end by a combined lateral magnification β34w at wide angle end, and f34w and f34t are combined focal lengths of the third unit and the fourth unit at wide angle end and telephoto end, respectively.

10 Claims, 16 Drawing Sheets

(56) References Cited

U.S. PATENT DOCUMENTS

2009/0086334 A1\* 4/2009 Take .............................. 359/683

FOREIGN PATENT DOCUMENTS

| JP | 2010048855 A | 3/2010 |
| JP | 2012063661 A | 3/2012 |

OTHER PUBLICATIONS

Office Action issued in Japanese Appln. No. 2012-228696 mailed Jul. 12, 2016.
English Translation of Office Action issued in Japanese Appln. No. 2012-228696 mailed Jul. 12, 2016.

\* cited by examiner

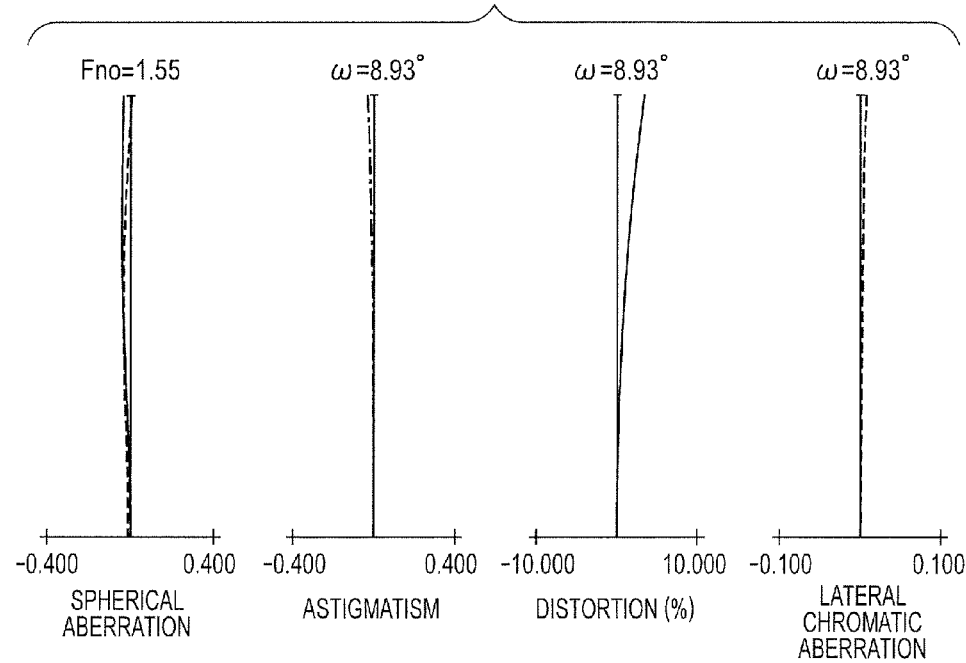
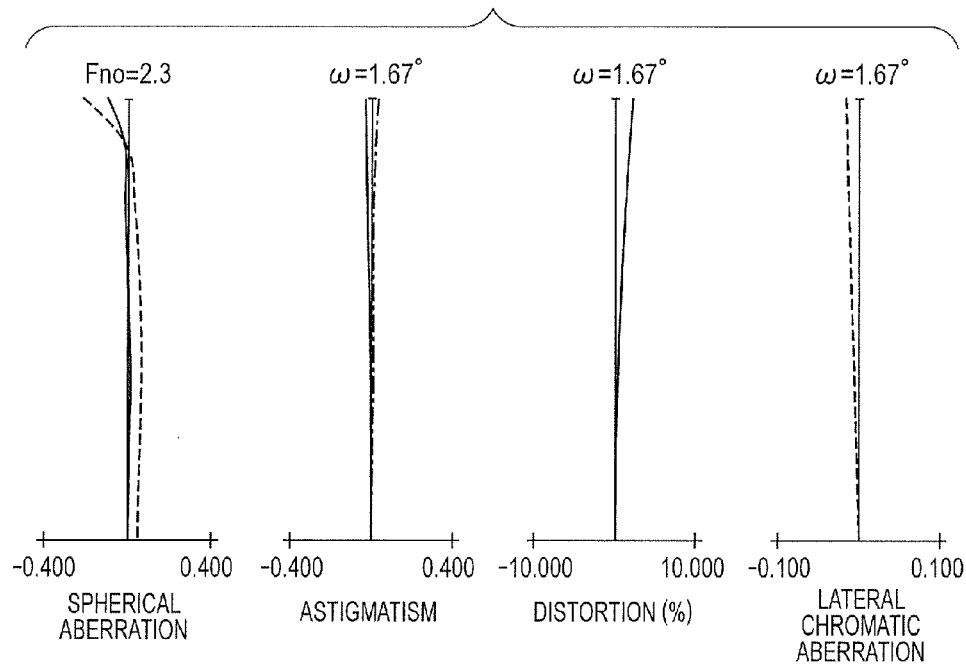

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, which are suitable for a broadcasting television camera, a video camera, a digital still camera, and a silver-halide film camera, for example.

2. Description of the Related Art

In recent years, a zoom lens having a wide angle of field, a high magnification ratio, and high optical performance is required for an image pickup apparatus such as a television camera, a silver-halide film camera, a digital camera, or a video camera. As a zoom lens having a wide angle of field and a high magnification ratio, there is known a positive lead type five-unit zoom lens constituted of five lens units including a positive refractive power lens unit disposed closest to an object side. As this positive lead type zoom lens, there is known a five-unit zoom lens in which a zoom lens unit having functions as a variator and a compensator is constituted of three movable lens units, which move in different loci from each other (Japanese Patent Application Laid-Open Nos. 2009-128492, H08-234105, and H01-126614).

Japanese Patent Application Laid-Open No. 2009-128492 discloses a zoom lens having a magnification ratio of about 50 and including, in order from an object side, a first lens unit having a positive refractive power, a second lens unit having a negative refractive power, a third lens unit having the positive refractive power, a fourth lens unit having the positive refractive power, and a fifth lens unit having the positive refractive power, in which the second to fourth lens units move accompanying zooming.

Japanese Patent Application Laid-Open No. Japanese Patent Application Laid-Open No. H08-234105 discloses a zoom lens having a magnification ratio of about 2.5 and including, in order from an object side, a first lens unit having a positive refractive power, a second lens unit having a negative refractive power, a third lens unit having the negative refractive power, a fourth lens unit having the positive refractive power, and a fifth lens unit having the positive refractive power, in which the second to fourth lens units move accompanying zooming.

Japanese Patent Application Laid-Open No. Japanese Patent Application Laid-Open No. H01-126614 discloses a zoom lens having a magnification ratio of about 5 and including, in order from an object side, a first lens unit having a positive refractive power, a second lens unit having a negative refractive power, a third lens unit having the negative refractive power, a fourth lens unit having the positive refractive power, and a fifth lens unit having the positive refractive power, in which the second to fourth lens units move accompanying zooming.

Problems in attaining the high magnification ratio with the five-unit zoom lenses of Japanese Patent Application Laid-Open Nos. 2009-128492, H08-234105, and H01-126614 include an increase in overall length accompanying an increase in amounts of movement of the moving lens units, and an increase in variations in aberrations accompanying the zooming.

In the five-unit zoom lens, in order to obtain high optical performance while attaining the reductions in size and weight and the high magnification ratio, it is important to appropriately set a paraxial arrangement of each of the second, third, and fourth lens units as zoom lens units from a wide angle end to a telephoto end.

It is also important to appropriately set a combined refractive power of the third and fourth lens units, a movement locus of the fourth lens unit from the wide angle end to an intermediate zoom position, and the like.

SUMMARY OF THE INVENTION

The present invention provides a zoom lens capable of suppressing an increase in size accompanying an increase in overall length and of satisfactorily correcting aberrations while attaining a high magnification ratio by appropriately defining a refractive power arrangement, movement loci of lens units which move during zooming, and the like, and to provide an image pickup apparatus including the zoom lens.

A zoom lens according to one embodiment of the present invention includes, in order from an object side: a first lens unit having a positive refractive power, which does not move for zooming; a second lens unit having a negative refractive power, which moves during zooming; a third lens unit having the positive refractive power, which moves during zooming; a fourth lens unit having the positive refractive power, which moves during zooming; and a fifth lens unit having the positive refractive power, which does not move for zooming, in which the following conditional expressions are satisfied:

$$1.50 < LN(Z2)/LN(Z34) < 2.30; \text{ and}$$

$$0.70 < f34w/f34t < 0.96,$$

where $LN(Z2)$ is a natural logarithm of a value $Z2$ $(=\beta 2t/(\beta 2w))$ obtained by dividing a lateral magnification $\beta 2t$ of the second lens unit at a telephoto end by a lateral magnification $\beta 2w$ at a wide angle end, $LN(Z34)$ is a natural logarithm of a value $Z34$ $(=\beta 34t/(\beta 34w))$ obtained by dividing a combined lateral magnification $\beta 34t$ of the third lens unit and the fourth lens unit at the telephoto end by a combined lateral magnification $\beta 34w$ at the wide angle end, $f34w$ is a combined focal length of the third lens unit and the fourth lens unit at the wide angle end and the telephoto end, and $f34t$ is a combined focal length of the third lens unit and the fourth lens unit at the telephoto end.

According to the present invention, the zoom lens capable of suppressing an increase in size accompanying an increase in the overall length and of satisfactorily correcting aberrations while attaining a high magnification ratio can be obtained.

Further features of the present invention will become apparent from the following description of exemplary embodiments with reference to the attached drawings.

BRIEF DESCRIPTION OF THE DRAWINGS

FIG. 14B is an aberration diagram of the zoom lens according to Embodiment 7 at the focal length of 35 mm.

FIG. 14C is an aberration diagram of the zoom lens according to Embodiment 7 at the telephoto end.

DESCRIPTION OF THE EMBODIMENTS

Embodiments of the present invention are described in detail below with reference to the accompanying drawings.

A zoom lens according to the present invention includes, in order from an object side to an image side, a first lens unit having a positive refractive power, which does not move for zooming, a second lens unit having a negative refractive power, which moves during zooming, a third lens unit having the positive refractive power, which moves during zooming, a fourth lens unit having the positive refractive power, which moves during zooming, and further a fifth lens unit having the positive refractive power, which does not move for zooming.

Figure 1:
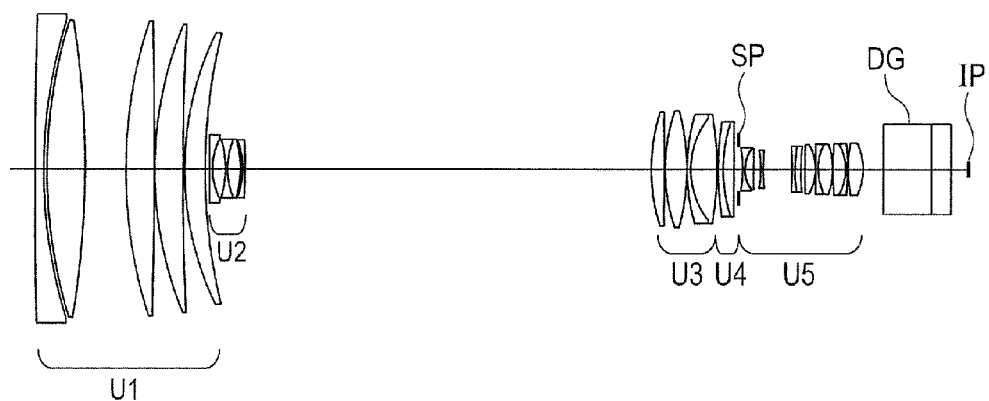
FIG. 1 is a lens cross-sectional view of a zoom lens according to Embodiment 1 at a wide angle end.
Figure 2A:
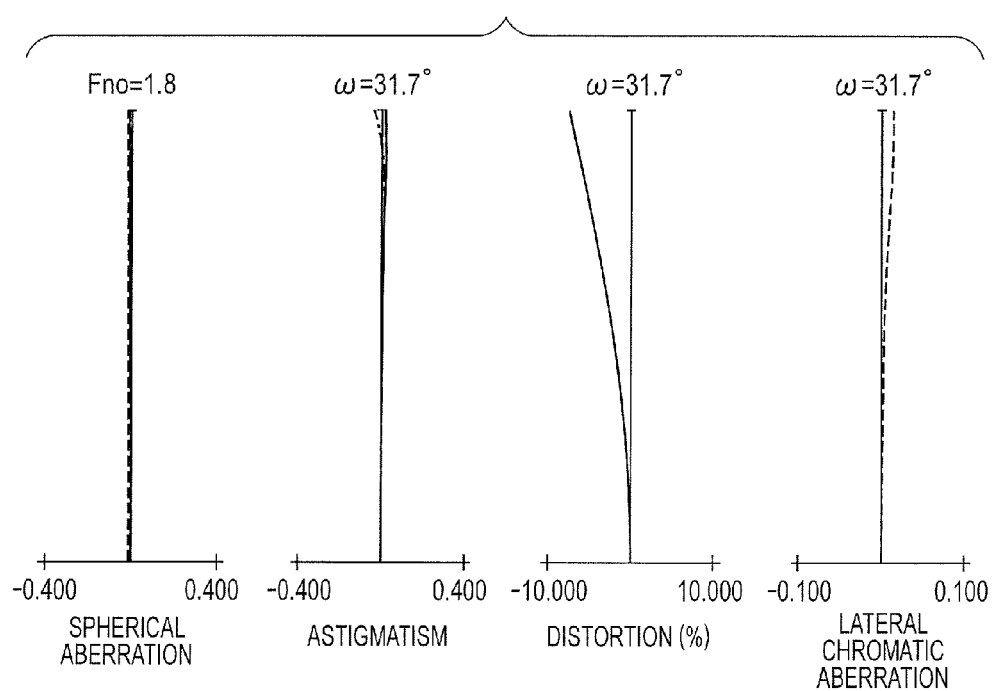
FIG. 2A is an aberration diagram of the zoom lens according to Embodiment 1 at the wide angle end.
Figure 2B:
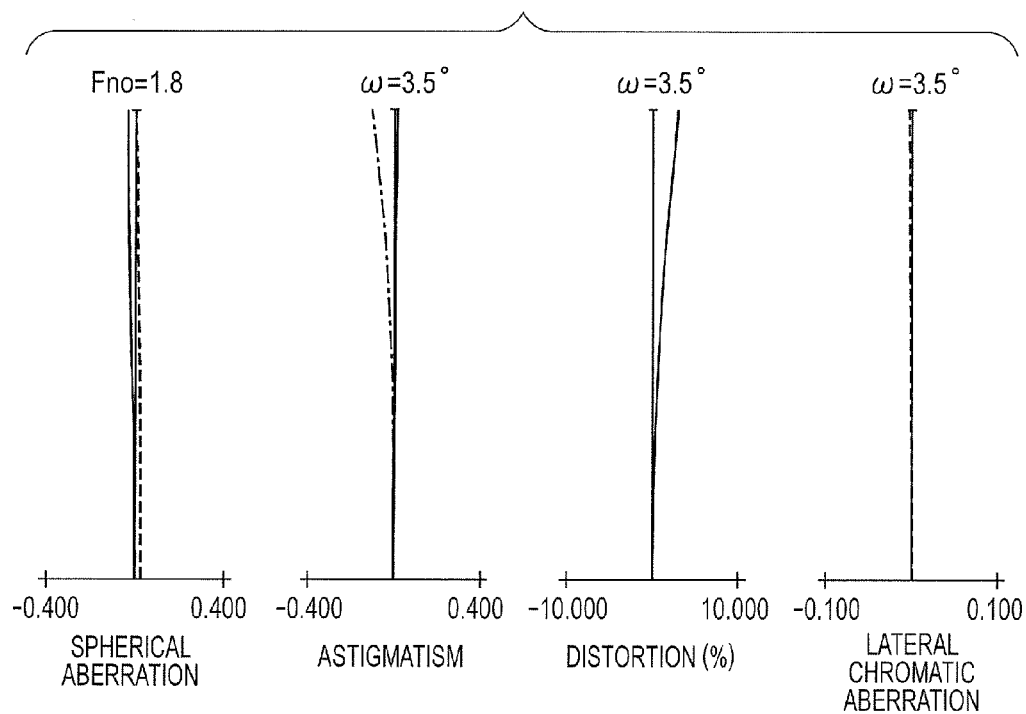
FIG. 2B is an aberration diagram of the zoom lens according to Embodiment 1 at a focal length of 90 mm.
Figure 2C:
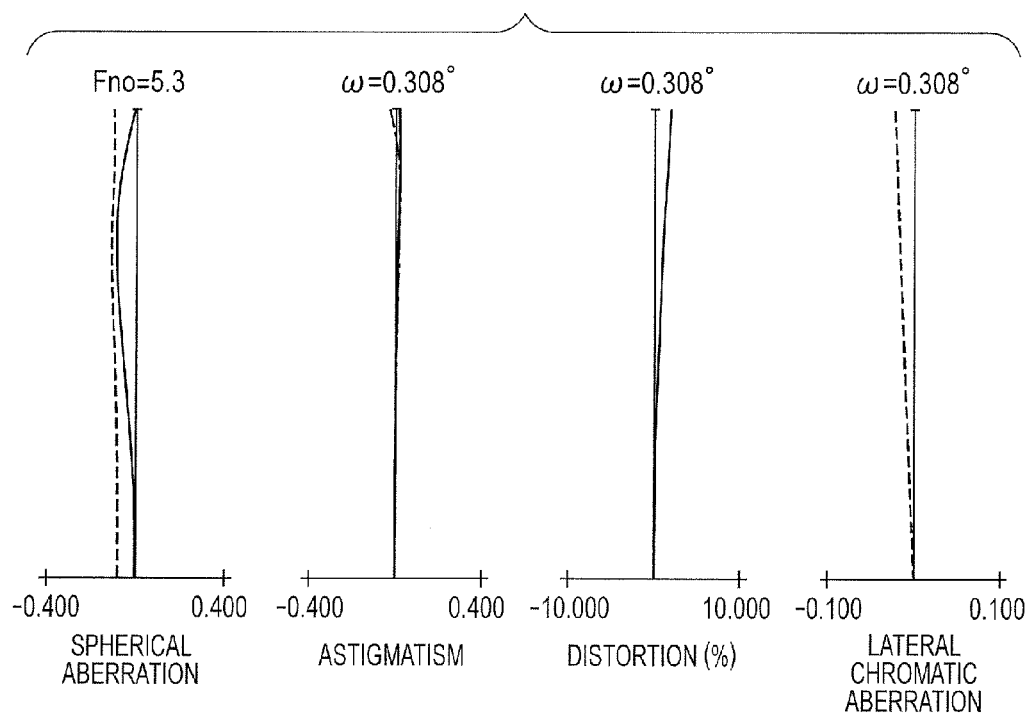
FIG. 2C is an aberration diagram of the zoom lens according to Embodiment 1 at a telephoto end.

FIG. 1 is a lens cross-sectional view when focused on an object at infinity at the wide angle end (short focal length end) according to Numerical Embodiment 1 as Embodiment 1 of the present invention. FIGS. 2A to 2C are longitudinal aberration diagrams when focused on the object at infinity at the wide angle end (A), f=90 mm (B), and the telephoto end (long focal length end) (C) according to Numerical Embodiment 1, respectively.

Figure 3:
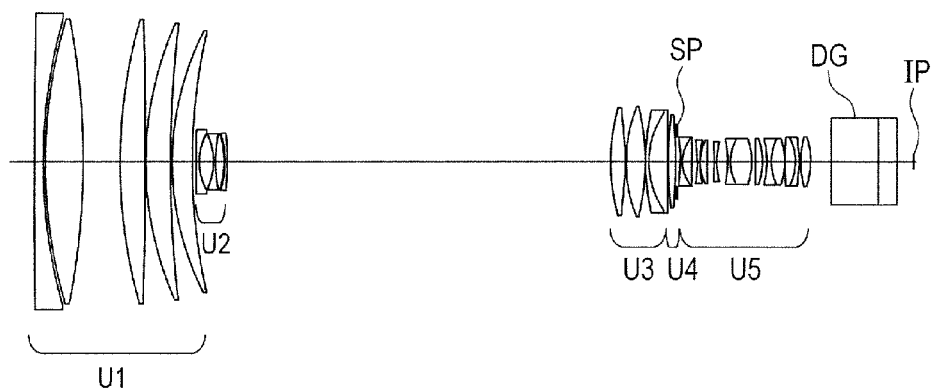
FIG. 3 is a lens cross-sectional view of a zoom lens according to Embodiment 2 at the wide angle end.
Figure 4A:
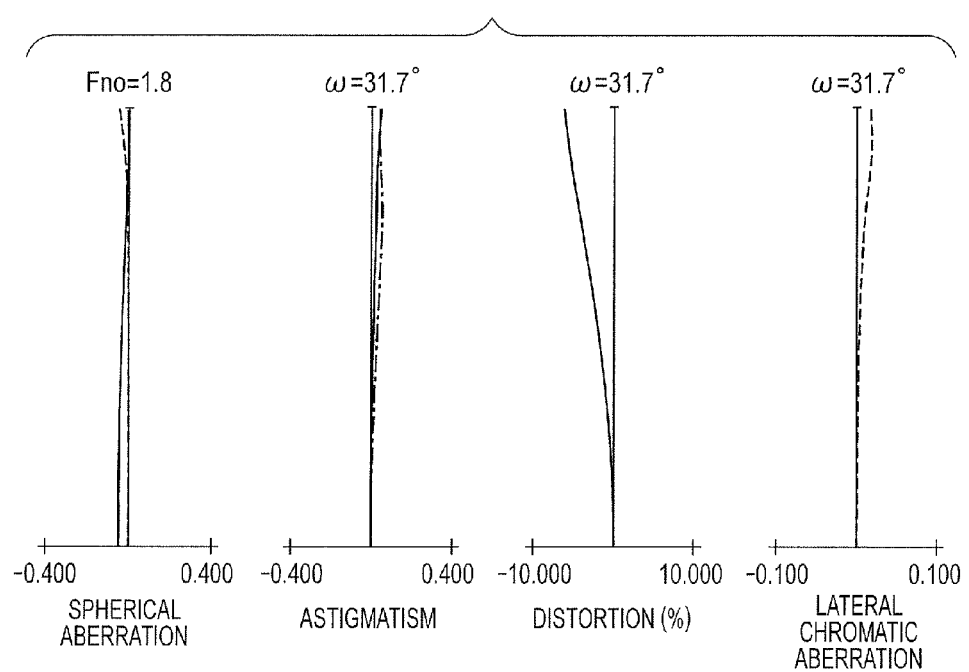
FIG. 4A is an aberration diagram of the zoom lens according to Embodiment 2 at the wide angle end.
Figure 4B:
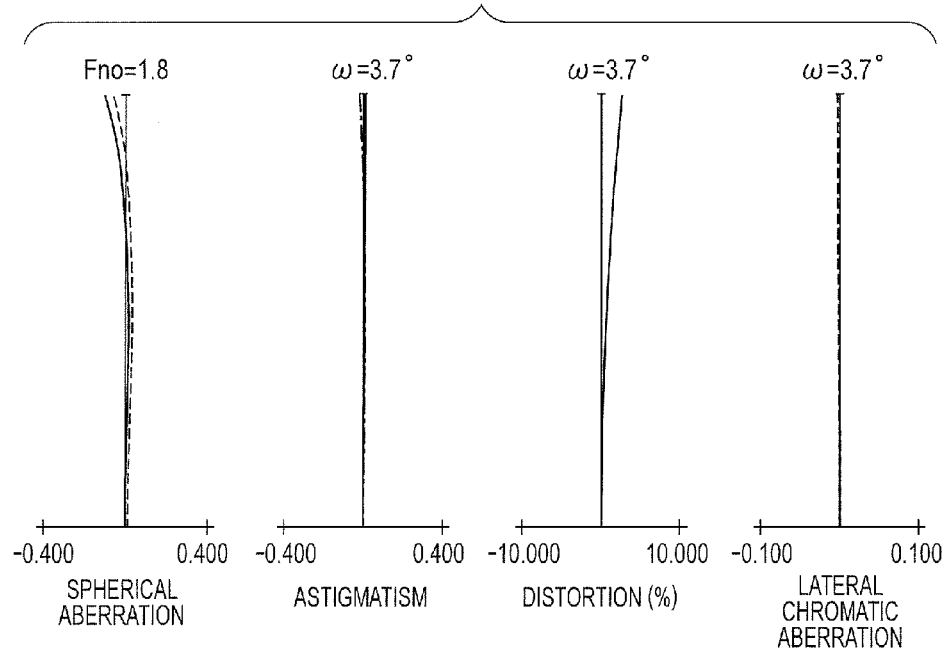
FIG. 4B is an aberration diagram of the zoom lens according to Embodiment 2 at a focal length of 85 mm.
Figure 4C:
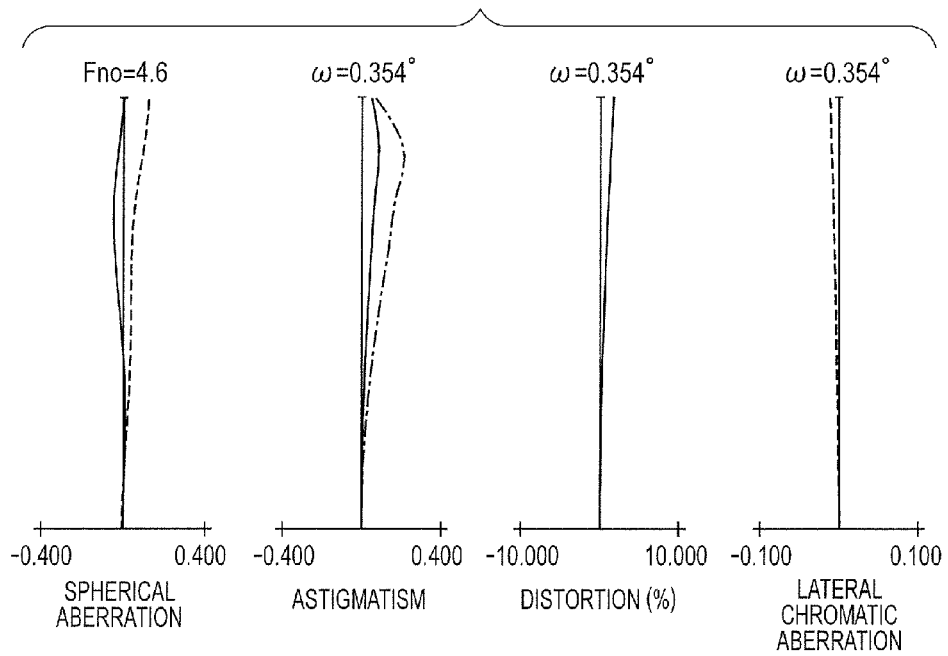
FIG. 4C is an aberration diagram of the zoom lens according to Embodiment 2 at the telephoto end.

FIG. 3 is a lens cross-sectional view when focused on an object at infinity at the wide angle end according to Numerical Embodiment 2 as Embodiment 2 of the present invention. FIGS. 4A to 4C are longitudinal aberration diagrams when focused on the object at infinity at the wide angle end (A), f=85 mm (B), and the telephoto end (C) according to Numerical Embodiment 2, respectively.

Figure 5:
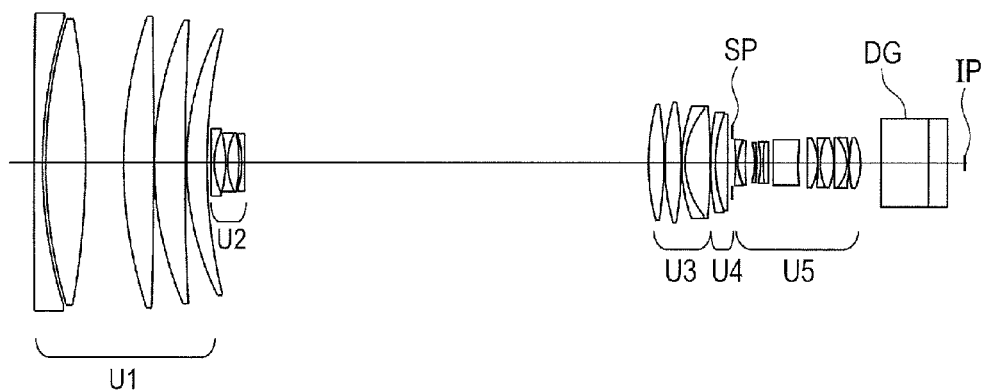
FIG. 5 is a lens cross-sectional view of a zoom lens according to Embodiment 3 at the wide angle end.
Figure 6A:
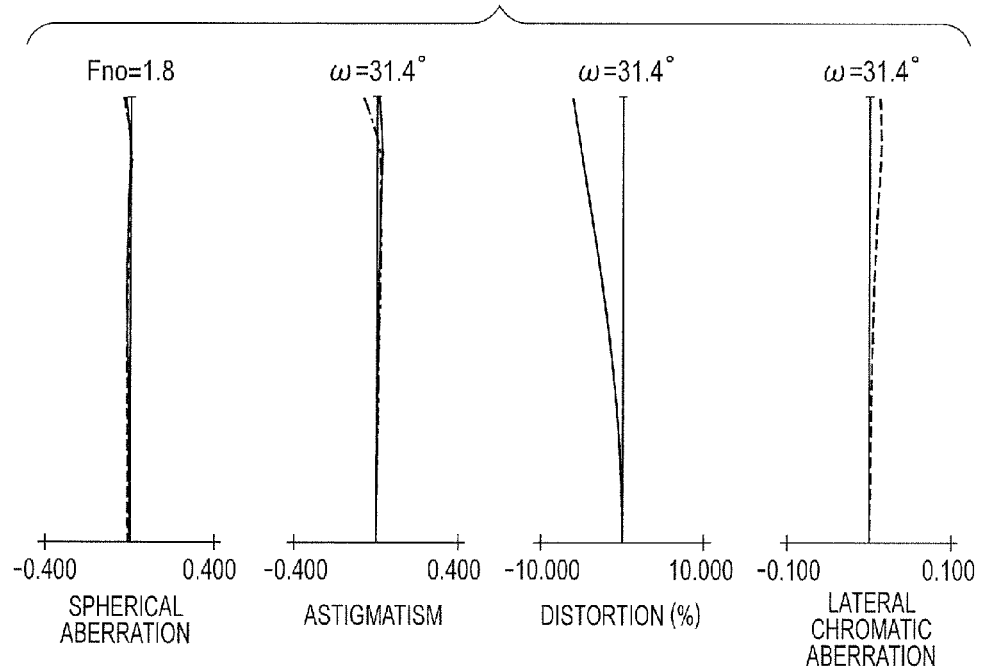
FIG. 6A is an aberration diagram of the zoom lens according to Embodiment 3 at the wide angle end.
Figure 6B:
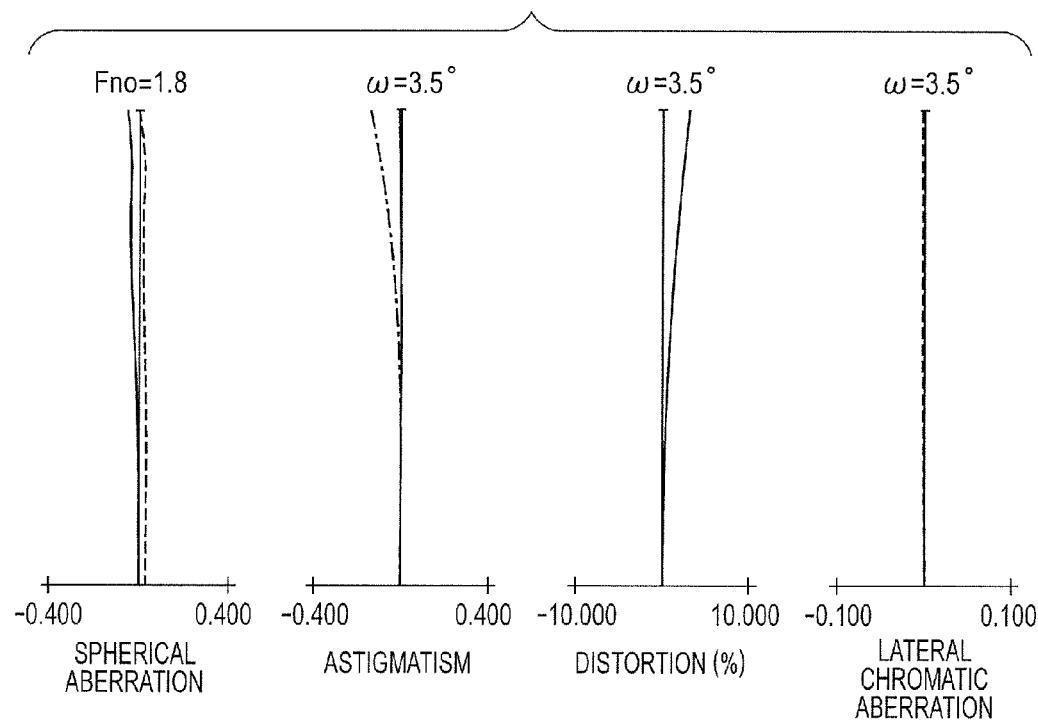
FIG. 6B is an aberration diagram of the zoom lens according to Embodiment 3 at a focal length of 90 mm.
Figure 6C:
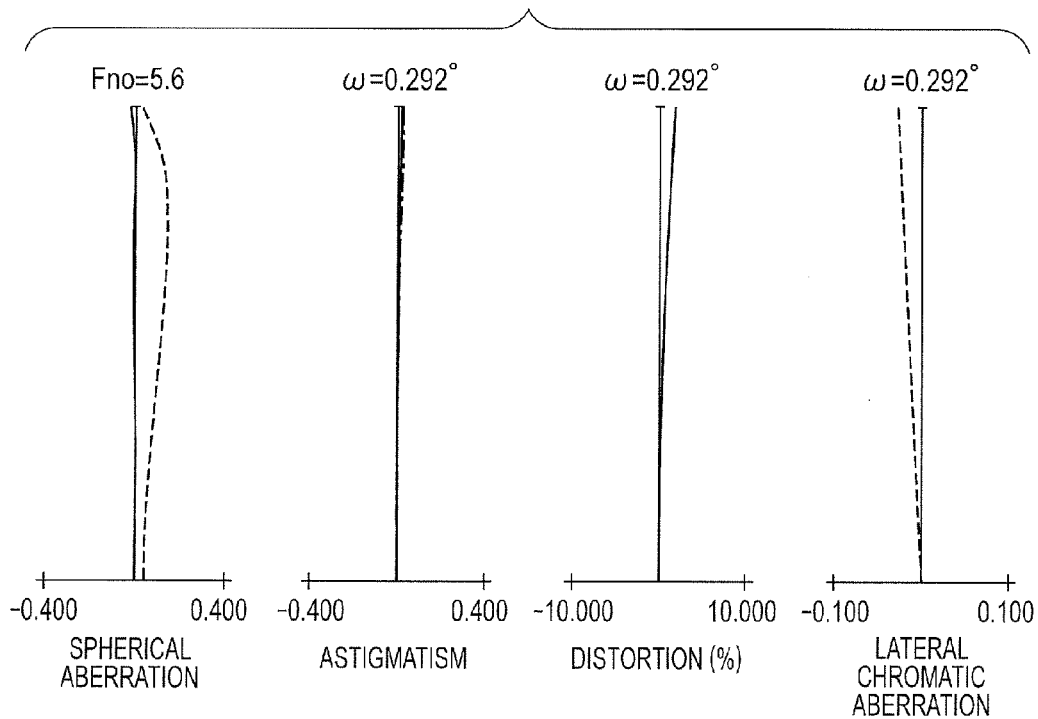
FIG. 6C is an aberration diagram of the zoom lens according to Embodiment 3 at the telephoto end.

FIG. 5 is a lens cross-sectional view when focused on an object at infinity at the wide angle end according to Numerical Embodiment 3 as Embodiment 3 of the present invention. FIGS. 6A to 6C are longitudinal aberration diagrams when focused on the object at infinity at the wide angle end (A), f=90 mm (B), and the telephoto end (C) according to Numerical Embodiment 3, respectively.

Figure 7:
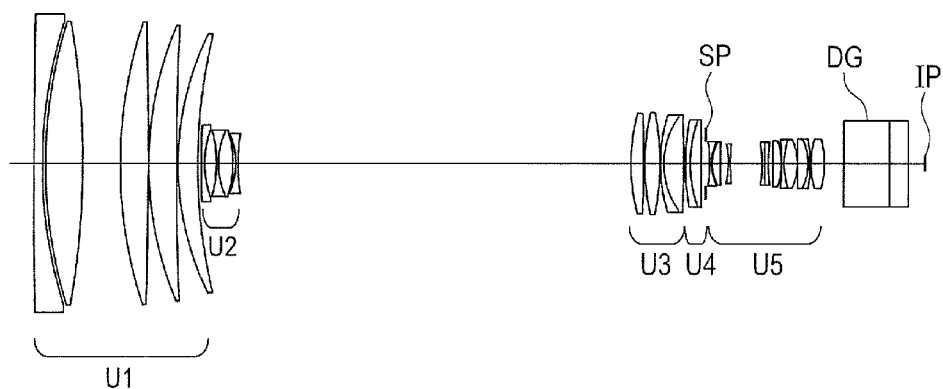
FIG. 7 is a lens cross-sectional view of a zoom lens according to Embodiment 4 at the wide angle end.
Figure 8A:
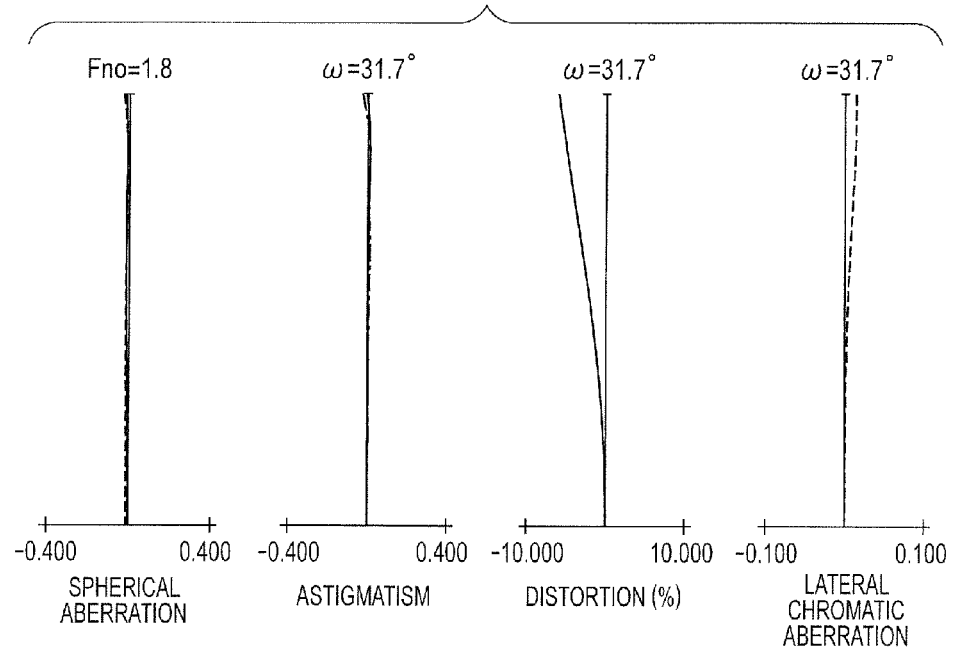
FIG. 8A is an aberration diagram of the zoom lens according to Embodiment 4 at the wide angle end.
Figure 8B:
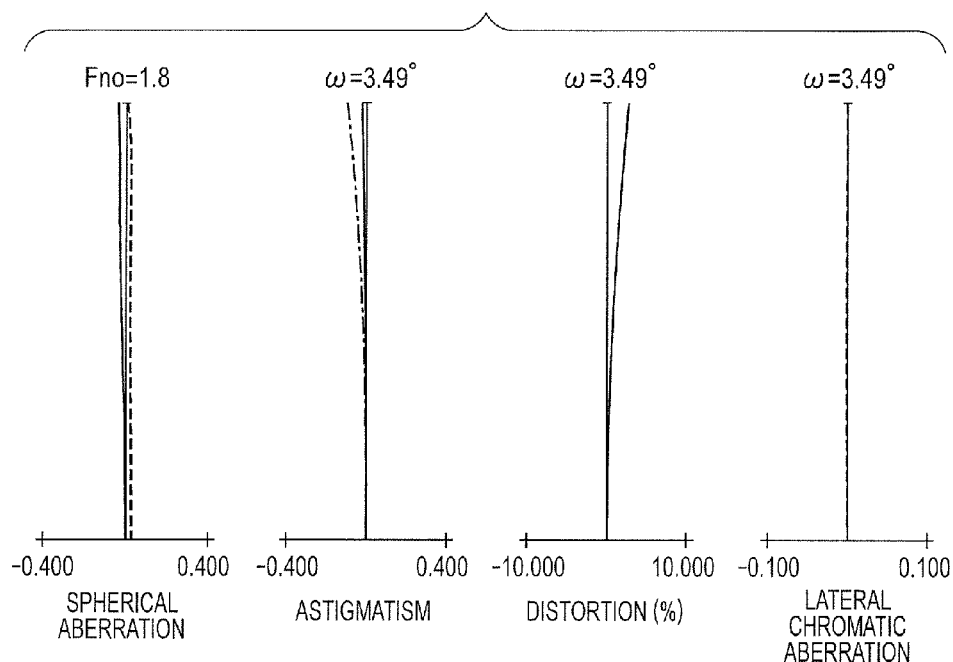
FIG. 8B is an aberration diagram of the zoom lens according to Embodiment 4 at the focal length of 90 mm.
Figure 8C:
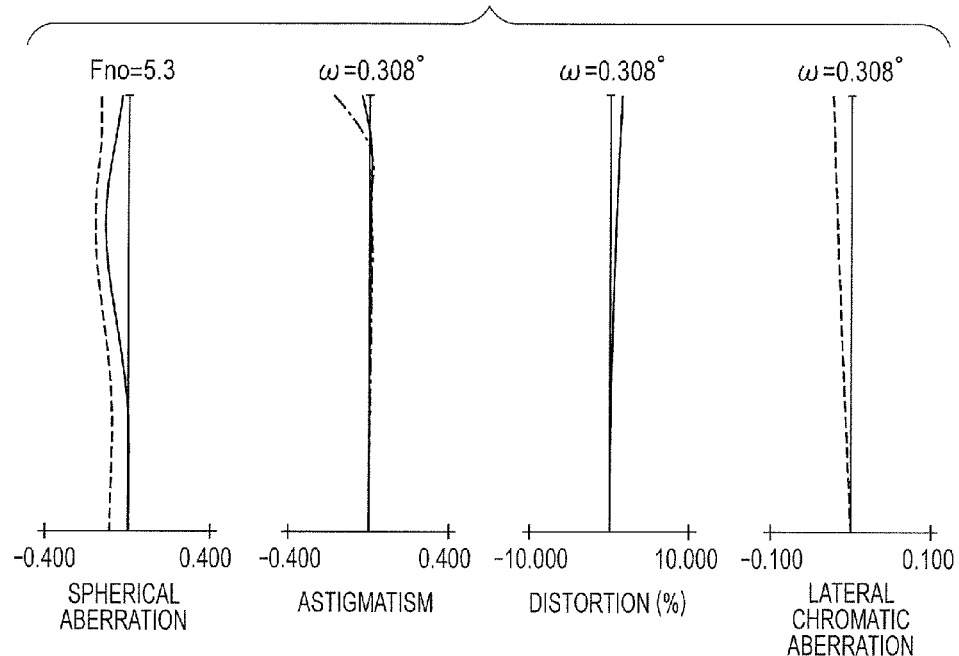
FIG. 8C is an aberration diagram of the zoom lens according to Embodiment 4 at the telephoto end.

FIG. 7 is a lens cross-sectional view when focused on an object at infinity at the wide angle end according to Numerical Embodiment 4 as Embodiment 4 of the present invention. FIGS. 8A to 8C are longitudinal aberration diagrams when focused on the object at infinity at the wide angle end (A), f=90 mm (B), and the telephoto end (C) according to Numerical Embodiment 4, respectively.

Figure 9:
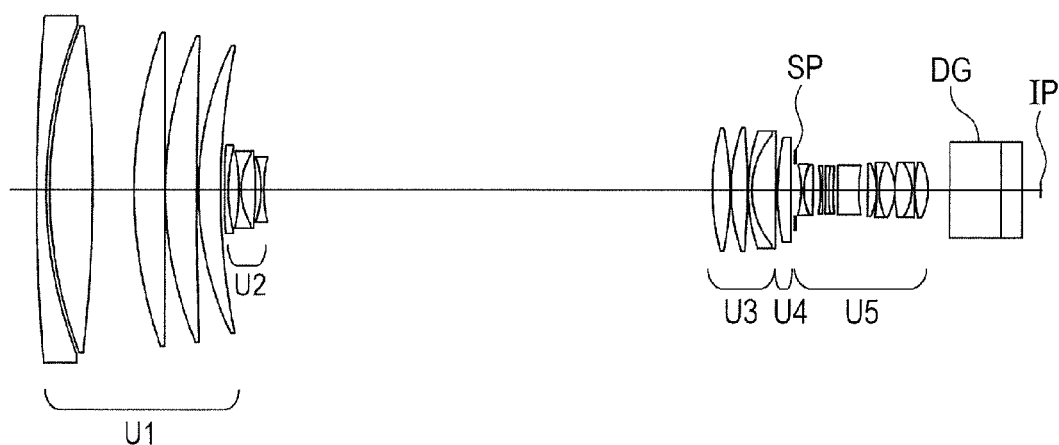
FIG. 9 is a lens cross-sectional view of a zoom lens according to Embodiment 5 at the wide angle end.
Figure 10A:
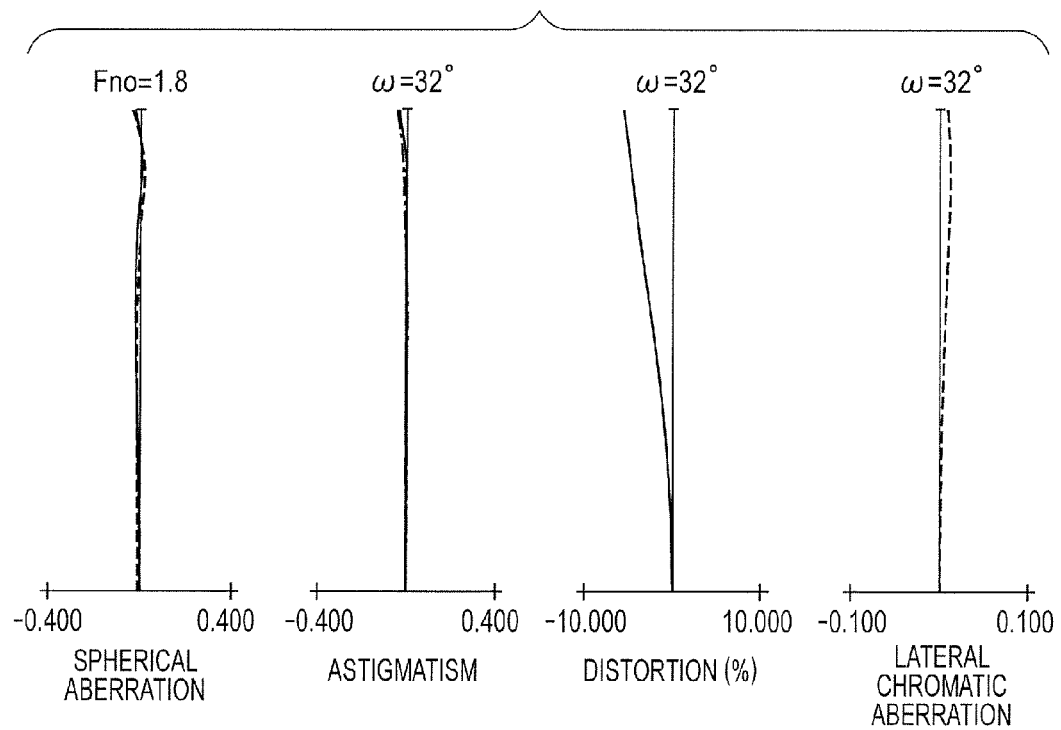
FIG. 10A is an aberration diagram of the zoom lens according to Embodiment 5 at the wide angle end.
Figure 10B:
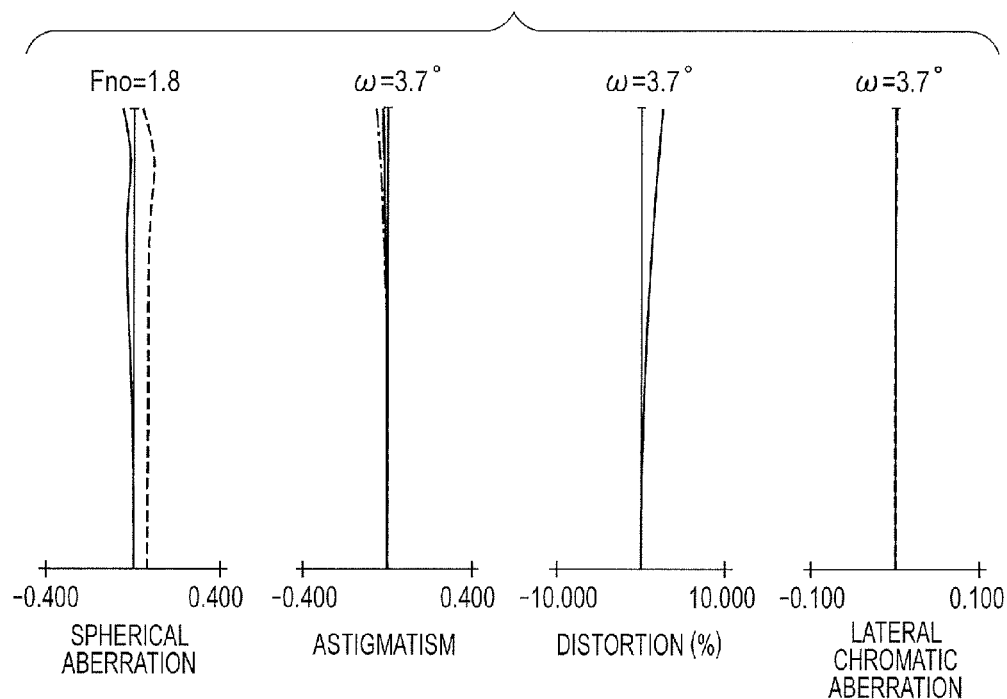
FIG. 10B is an aberration diagram of the zoom lens according to Embodiment 5 at the focal length of 85 mm.
Figure 10C:
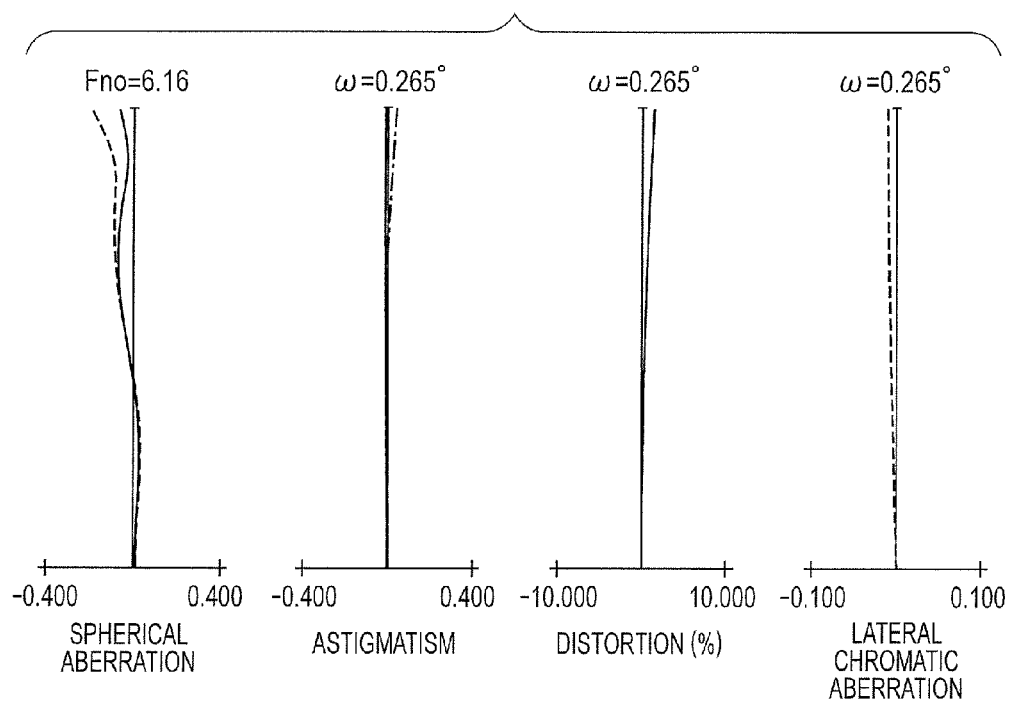
FIG. 10C is an aberration diagram of the zoom lens according to Embodiment 5 at the telephoto end.

FIG. 9 is a lens cross-sectional view when focused on an object at infinity at the wide angle end according to Numerical Embodiment 5 as Embodiment 5 of the present invention. FIGS. 10A to 10C are longitudinal aberration diagrams when focused on the object at infinity at the wide angle end (A), f=85 mm (B), and the telephoto end (C) according to Numerical Embodiment 5, respectively.

Figure 11:
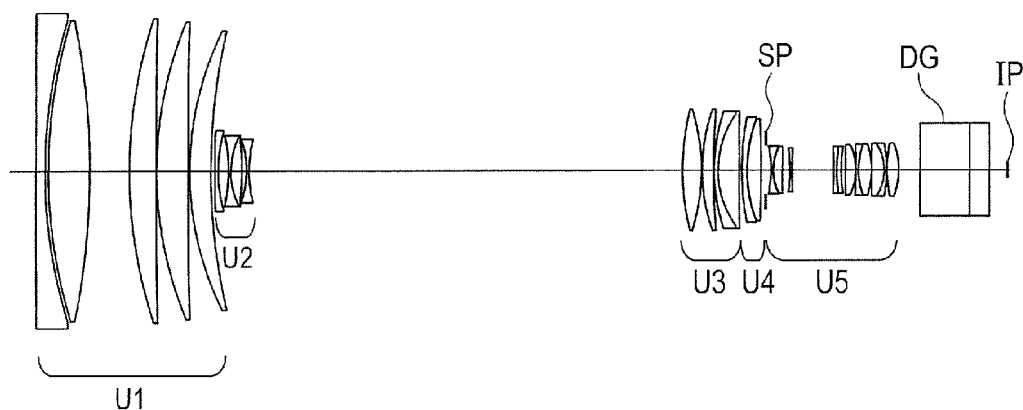
FIG. 11 is a lens cross-sectional view of a zoom lens according to Embodiment 6 at the wide angle end.
Figure 12A:
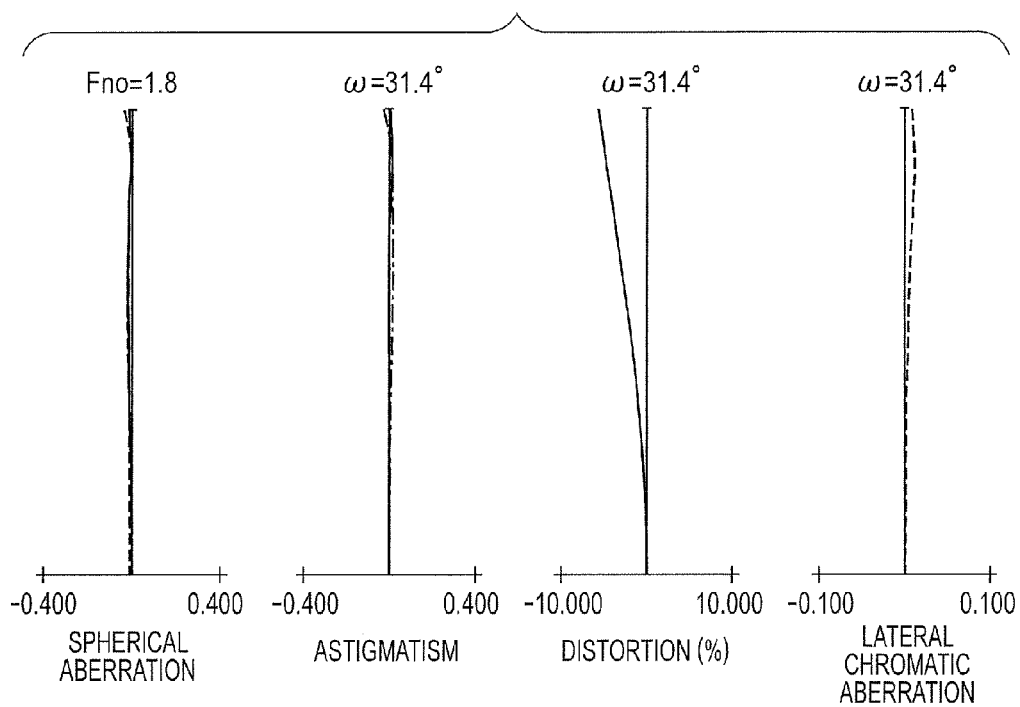
FIG. 12A is an aberration diagram of the zoom lens according to Embodiment 6 at the wide angle end.
Figure 12B:
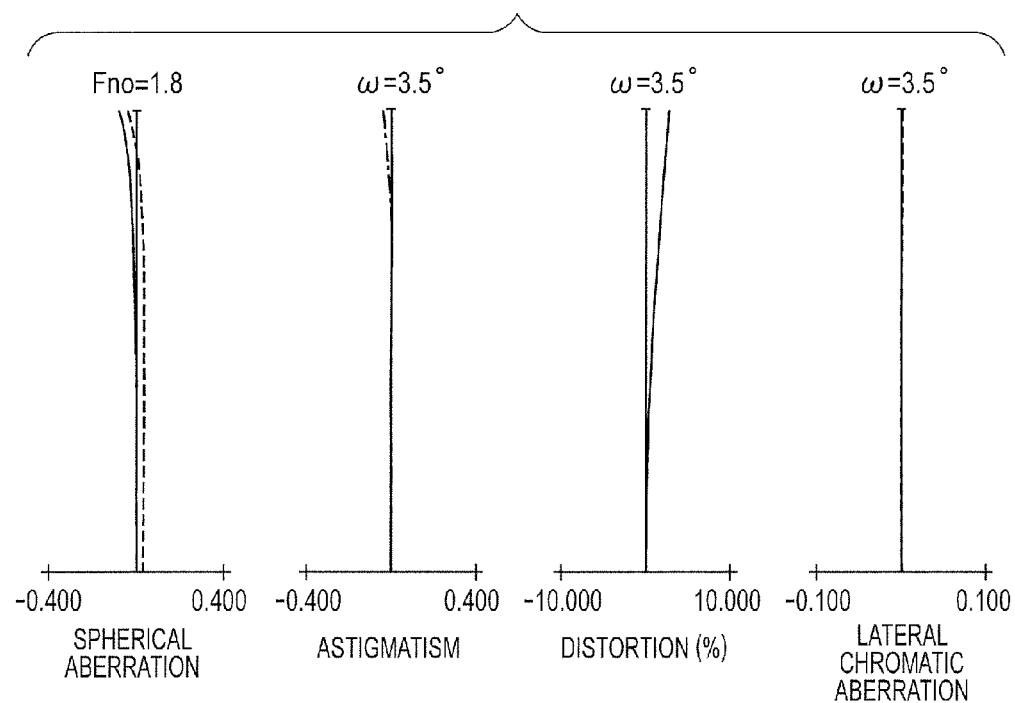
FIG. 12B is an aberration diagram of the zoom lens according to Embodiment 6 at the focal length of 90 mm.
Figure 12C:
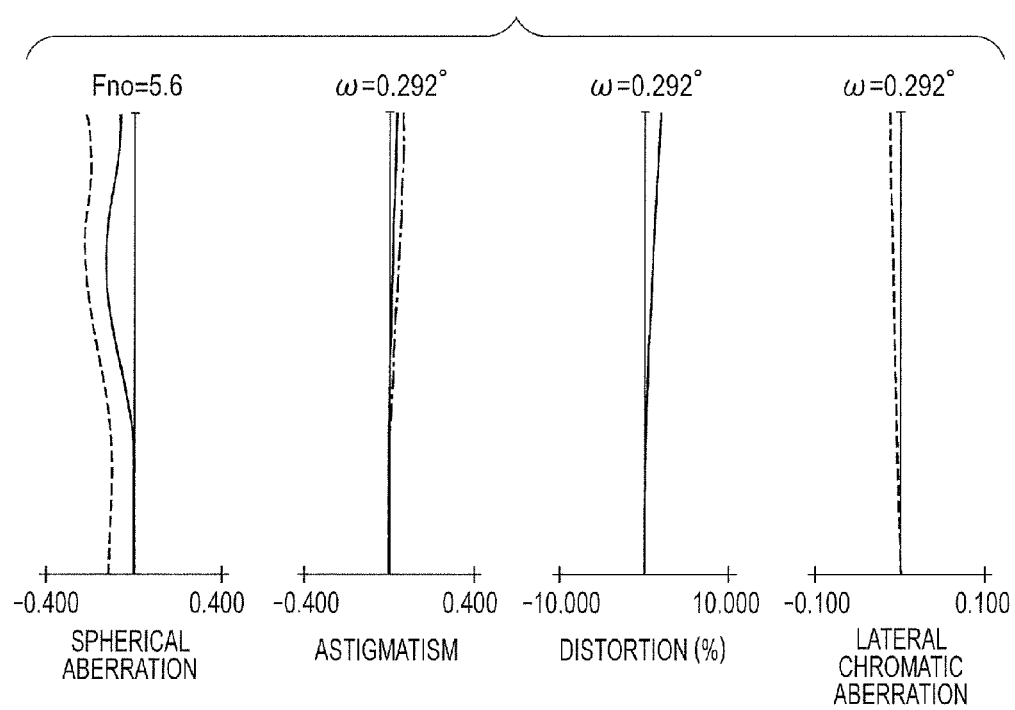
FIG. 12C is an aberration diagram of the zoom lens according to Embodiment 6 at the telephoto end.

FIG. 11 is a lens cross-sectional view when focused on an object at infinity at the wide angle end according to Numerical Embodiment 6 as Embodiment 6 of the present invention. FIGS. 12A to 12C are longitudinal aberration diagrams when focused on the object at infinity at the wide angle end (A), f=90 mm (B), and the telephoto end (C) according to Numerical Embodiment 6, respectively.

Figure 13:
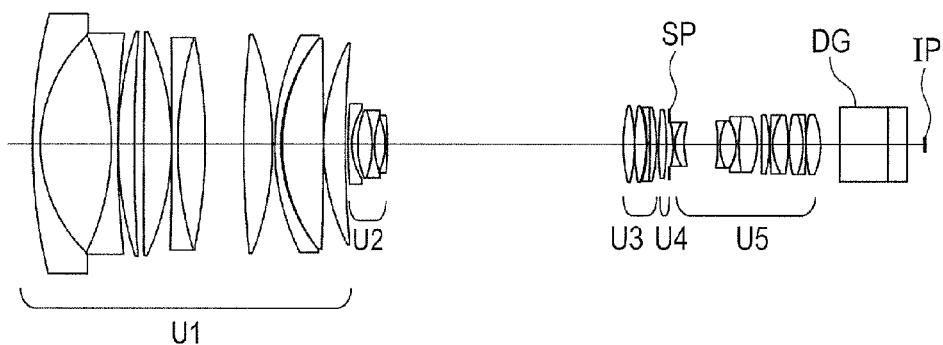
FIG. 13 is a lens cross-sectional view of a zoom lens according to Embodiment 7 at the wide angle end.
Figure 14A:
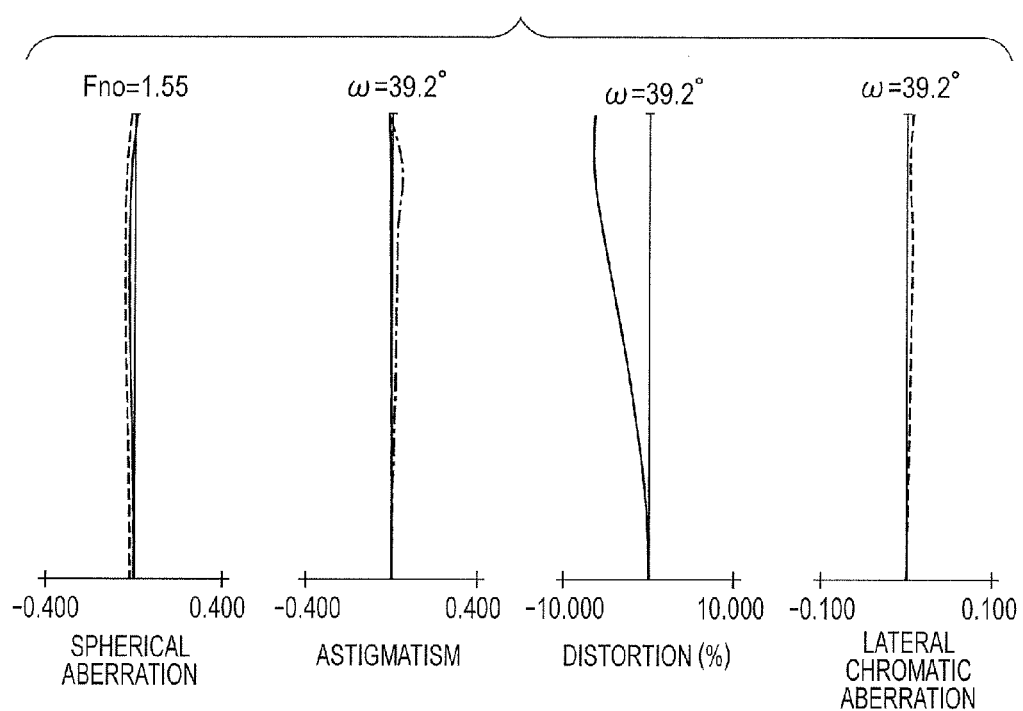
FIG. 14A is an aberration diagram of the zoom lens according to Embodiment 7 at the wide angle end.

FIG. 13 is a lens cross-sectional view when focused on an object at infinity at the wide angle end according to Numerical Embodiment 7 as Embodiment 7 of the present invention. FIGS. 14A to 14C are longitudinal aberration diagrams when focused on the object at infinity at the wide angle end (A), f=35 mm (B), and the telephoto end (C) according to Numerical Embodiment 7, respectively.

Figure 15A:
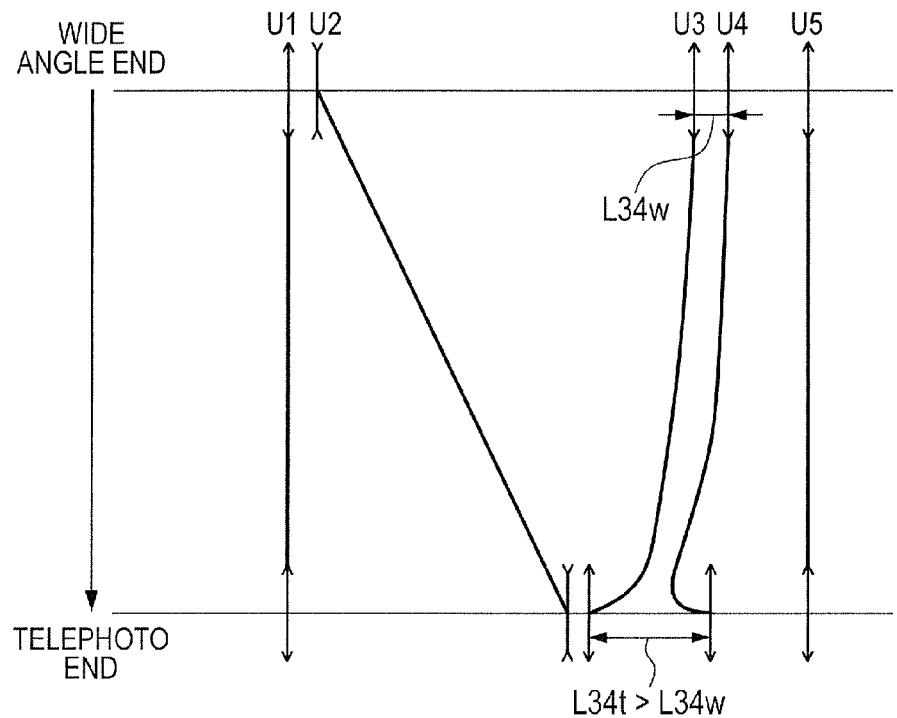
FIG. 15A is a schematic diagram of loci during zooming of a zoom lens according to the present invention.
Figure 15B:
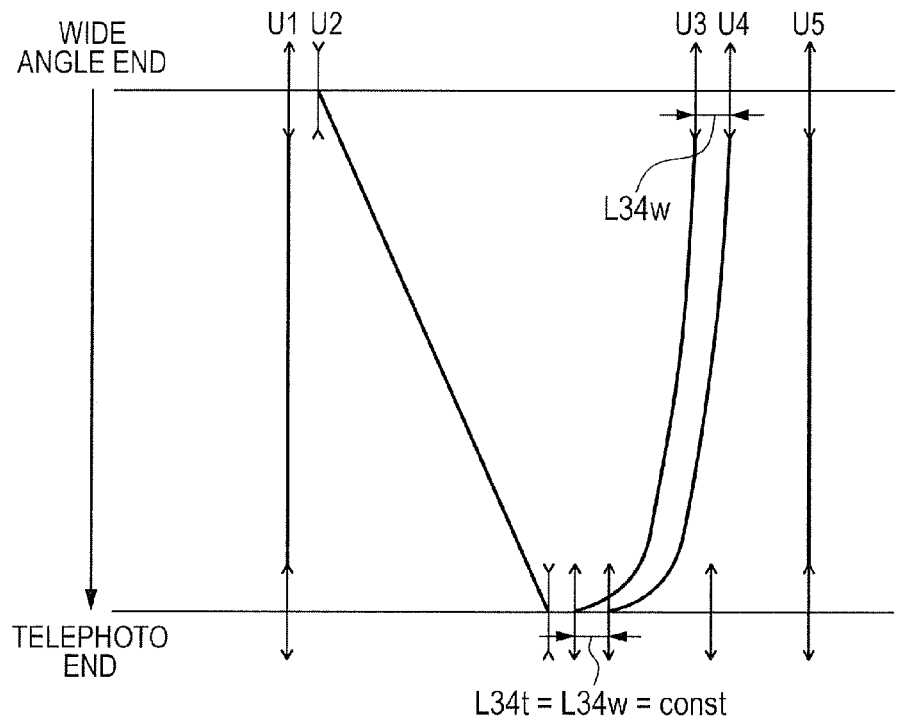
FIG. 15B is a schematic diagram of movement loci of a substantial four-unit zoom lens in which third and fourth lens units move together to be compared with the zoom lens according to the present invention.

FIG. 15A is a schematic diagram of a zoom lens according to the present invention, and FIG. 15B is a schematic diagram of a paraxial arrangement of a five-unit zoom lens corresponding to a four-unit zoom lens, in which an interval between a third lens unit and a fourth lens unit is fixed during zooming. In the lens cross-sectional views, the left side is a subject (object) side (front side), and the right side is an image side (rear side). A first lens unit U1 having the positive refractive power does not move for zooming. A second lens unit U2 having the negative refractive power moves during zooming, and is moved on an optical axis to an image plane side to perform zooming from the wide angle end to the telephoto end. A third lens unit U3 and a fourth lens unit U4 having the positive refractive power both move during zooming, and move on the optical axis from the wide angle end to the telephoto end. An aperture stop is denoted by SP, and a fifth lens unit (relay lens unit) U5 having the positive refractive power and an imaging action does not move for zooming. In the fifth lens unit U5, a converter (extender) for converting a focal length, and the like may be mounted. DG represents a color separation prism, an optical filter, and the like, which is illustrated as a glass block in the corresponding figures. An image plane IP corresponds to an image plane of a solid-state image pickup element.

In the aberration diagrams, the straight line and the broken line in the spherical aberration graphs are representative of spherical aberrations for e-line and a g-line, respectively. The solid line and the alternate long and short dash line in the astigmatism graphs are representative of astigmatisms in a sagittal image plane and a meridional image plane, respectively, and a lateral chromatic aberration is represented by the g-line. The astigmatism and the lateral chromatic aberration indicate amounts of aberrations when a ray passing through a center of a light flux at the stop position is a principal ray. ω is a paraxial half angle of field, and Fno is an F-number. Note that, in the following embodiments, the wide angle end and the telephoto end refer to zoom positions where the lens units for zooming are mechanically located at both ends of a movable range on the optical axis.

The zoom lens of each of the embodiments satisfactorily corrects the aberrations while attaining both a high magnification ratio and reductions in size and weight of the entire system by defining a ratio of a magnification ratio of the second lens unit and a combined magnification ratio of the third lens unit and the fourth lens unit, and a ratio of combined focal lengths of the third lens unit and the fourth lens unit at the wide angle end and the telephoto end.

To be specific, in a zoom lens including, in order from an object side, a first lens unit having a positive refractive power, which does not move for zooming, a second lens unit having a negative refractive power, which moves during zooming, a third lens unit having the positive refractive power, which moves during zooming, a fourth lens unit having the positive refractive power, which moves during zooming, and a fifth lens unit having the positive refractive power, which does not move for zooming, the following conditional expressions are satisfied:

$$1.50 < LN(Z2)/LN(Z34) < 2.30; \text{ and}$$

$$0.70 < f34w/f34t < 0.96,$$

where LN(Z2) is a natural logarithm of a value Z2 (=β2t/(β2w)) obtained by dividing a lateral magnification β2t of the second lens unit at the telephoto end by a lateral magnification β2w at the wide angle end, LN(Z34) is a natural logarithm of a value Z34 (=β34t/(β34w)) obtained by dividing a combined lateral magnification β34t of the third lens unit and the fourth lens unit at the telephoto end by a combined lateral magnification β34w at the wide angle end, f34w is a combined focal length of the third lens unit and the fourth lens unit at the wide angle end, and f34t is a combined focal length of the third lens unit and the fourth lens unit at the telephoto end.

Now referring to schematic diagrams and the like, a detailed description of features and a description of effects thereof are given.

The zoom lens according to the present invention has a configuration for facilitating the attainment of the high magnification ratio by setting an amount of movement of the second lens unit as a main zoom lens unit larger than those of the third lens unit and the fourth lens unit as the other moving lens units at the telephoto end. Specific movement loci are described with reference to FIGS. 15A and 15B, which are schematic diagrams. FIG. 15A is a schematic diagram illustrating loci of lens units which move during zooming according to the present invention, and FIG. 15B is a schematic diagram illustrating loci in a case corresponding to the four-unit zoom lens in which the lens units which move during zooming include two lens units, that is, a case where the third lens unit and the fourth lens unit follow the same locus. In contrast to the case as illustrated in FIG. 15B where the third lens unit and the fourth lens unit move in unison, in FIG. 15A, the second lens unit, the third lens unit, and the fourth lens unit follow such loci as to increase, decrease, and further decrease the amounts of displacement in an optical axis direction at the telephoto end with reference to the wide angle end, respectively.

Figure 16A:
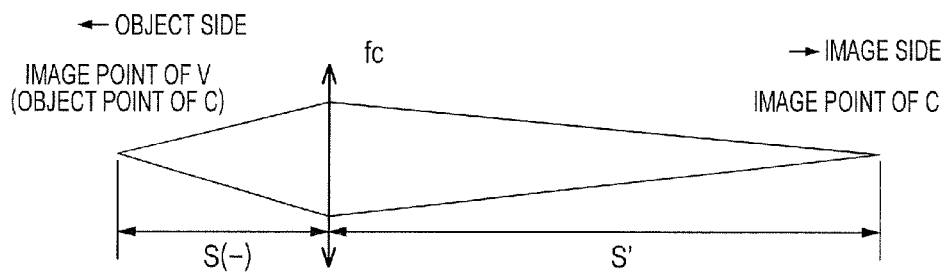
FIG. 16A is a schematic diagram of a paraxial arrangement at the telephoto end.
Figure 16B:
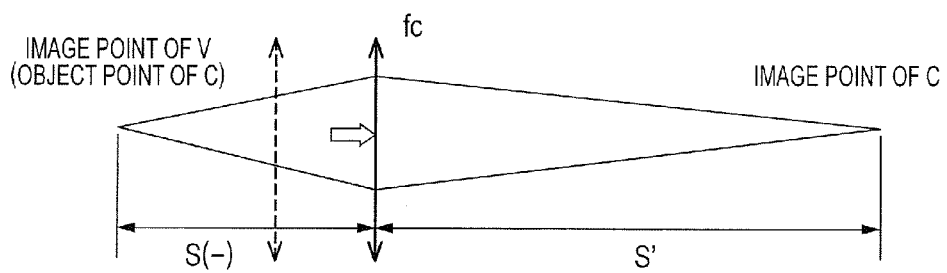
FIG. 16B is a schematic diagram of a paraxial arrangement at the telephoto end.

Now, a generally-used paraxial imaging expression (7) is used to describe the principle. The second lens unit is described here as a variator V, and the third lens unit and the fourth lens unit are regarded here as a single lens unit and described as a compensator C. FIGS. 16A and 16B are diagrams schematically illustrating a relationship between an image point of the variator V, an image point of the compensator C, and a disposition of the compensator C at the telephoto end according to the present invention.

$$1/s' = 1/s + 1/fc \qquad (7)$$

In the paraxial imaging expression (7), s is a distance from the image point of the variator V to the compensator C in FIGS. 16A and 16B, and takes a negative value in the configuration of the present invention.

Next, s' is a distance from the compensator C to the image point formed by the compensator C in FIGS. 16A and 16B, fc is a focal length of the compensator C, and both of s' and fc take positive values in the configuration of the present invention.

In a state in which the image point of the variator V and the image point of the compensator C are fixed, s and s' establish the following relational expression (8). Note that, const in Expression (8) means a constant.

$$|s| + |s'| = \text{const} \qquad (8)$$

Further, the zoom lens according to the present invention has a configuration in which the combined lateral magnification of the third lens unit and the fourth lens unit has a large negative value beyond −1 at the telephoto end, and hence satisfies the following inequality (9):

$$|s| < |s'| \qquad (9).$$

Meanwhile, the zoom lens according to the present invention has a feature in a configuration in which the compensator C may be arranged closer to the image side though the image point of the variator V and the image point of the compensator C are fixed, and hence the variator V may be displaced closer to the image side at the telephoto end. The compensator C placed closer to the image side while satisfying Expression (8) and Inequality (9) corresponds to a larger distance from the image point of the variator V to the compensator C as in FIG. 16B. Therefore, s in the right side of Expression (7) has a larger negative value. On the other hand, s' on the left side becomes smaller accordingly as s becomes larger, and hence a combined focal length fc of the compensator C needs to be increased.

In general, a combined focal length of two lens units is expressed by the following expression (10). e'34 is a principal point interval between the third lens unit and the fourth lens unit.

$$1/fc = 1/f3 + 1/f4 - e'34/(f3 \times f4) \qquad (10)$$

From the above expression (10), an interval L4$t$ between the third lens unit and the fourth lens unit may be increased at the telephoto end to increase the combined focal length fc of the compensator C, that is, the third lens unit and the fourth lens unit, and displace the variator V closer to the image side at the telephoto end. Moreover, L34$t$ may be increased by utilizing the fact that intervals among the third to fifth lens units are increased at the telephoto end, to thereby increase fc efficiently, and as a result, the magnification ratio of the second lens unit may be increased. In addition, the second lens unit has a smaller effective diameter and smaller weight than those of the third lens unit, and hence an amount of work for driving during zooming may be reduced by relatively increasing the amount of movement of the second lens unit to increase the magnification ratio. Further, lateral magnifications of the third and subsequent lens units are relatively reduced so that a magnification of aberrations generated in the second lens unit having a high refractive power may be reduced, and hence the aberrations on the telephoto side may be corrected advantageously in attaining the high magnification ratio.

As described above, according to the present invention, refractive power arrangements of the moving lens units at the wide angle end and the telephoto end are defined appropriately to obtain the configuration in which the magnification ratio of the second lens unit as the main zoom lens unit is increased. As a result, both the high magnification ratio and a reduction in overall lens length are attained.

The embodiments employ the configuration in which the magnification ratio Z2 of the second lens unit is larger than the combined magnification ratio Z34 of the third lens unit and the fourth lens unit so that the second lens unit as the main zoom lens unit makes a larger contribution in zooming.

Conditional Expression (1) defines a value (LN(Z2)/LN(Z34)) obtained by dividing the natural logarithm LN(Z2) of the magnification ratio Z2 (=β2$t$/(β2$w$) of the second lens unit by the natural logarithm LN(Z34) of the combined magnification ratio Z34 (=β34$t$/(β34$w$) of the third lens unit and the fourth lens unit.

$$1.50 < LN(Z2)/LN(Z34) < 2.30 \quad (1)$$

When the upper limit condition of Conditional Expression (1) is not satisfied, the amount of displacement of the second lens unit to the image side at the telephoto end is increased, which makes it hard to suppress variations in aberrations due to the zooming.

When the lower limit condition of Conditional Expression (1) is not satisfied, the effect of increasing the magnification ratio of the second lens unit cannot be obtained, which makes it hard to suppress the increase in overall lens length accompanying increases in amounts of movement of the moving lens units in attaining the high magnification ratio.

The embodiments employ the configuration in which, during zooming from the wide angle end to the telephoto end, the amount of displacement in the optical axis direction of the second lens unit as the main zoom lens unit at the telephoto end with reference to the wide angle end is increased as compared to that of the third lens unit. To be specific, the embodiments employ the configuration in which the combined focal length of the third lens unit and the fourth lens unit is increased at the telephoto end as compared to that at the wide angle end so that the amount of displacement of the second lens unit at the telephoto end is relatively increased. In the present invention, it is the second lens unit and the third lens unit that mainly contribute to the zooming, but the absolute value of the lateral magnification of the second lens unit at the wide angle end is smaller than that of the third lens unit. Therefore, the amount of displacement of the second lens unit may be relatively increased as compared to the amount of displacement of the third lens unit to efficiently increase the magnification ratio. As a result, the high magnification ratio may be attained without increasing the overall lens length.

Conditional Expression (2) defines a value (f34$w$/f34$t$) obtained by dividing the combined focal length f34$w$ of the third lens unit and the fourth lens unit at the wide angle end by the combined focal length f34$t$ of the third lens unit and the fourth lens unit at the telephoto end.

$$0.70 < f34w/f34t < 0.96 \quad (2)$$

When the upper limit condition of Conditional Expression (2) is not satisfied, the combined focal length of the third lens unit and the fourth lens unit at the telephoto end cannot be increased, and hence the amount of displacement of the second lens unit cannot be increased, which makes it hard to attain both the high magnification ratio and the reduction in overall lens length.

When the lower limit condition of Conditional Expression (2) is not satisfied, in order to increase the combined focal length of the third lens unit and the fourth lens unit at the telephoto end, the fourth lens unit is displaced to the image side at the telephoto end with reference to the wide angle end, which increases the overall lens length.

It is further preferred to set numerical ranges of Conditional Expressions (1) and (2) as follows:

$$1.65 < LN(Z2)/LN(Z34) < 2.20 \quad (1a); \text{ and}$$

$$0.77 < f34w/f34t < 0.92 \quad (2a).$$

As described above, the value obtained by dividing the natural logarithm of the magnification ratio of the second lens unit by the natural logarithm of the combined magnification ratio of the third lens unit and the fourth lens unit, and the value obtained by dividing the combined focal length f34$w$ of the third lens unit and the fourth lens unit at the wide angle end by the combined focal length f34$t$ of the third lens unit and the fourth lens unit at the telephoto end are defined to attain both the high magnification ratio and the reductions in size and weight. In the embodiments, it is further preferred to satisfy at least one of the following conditions.

Amounts of displacement on the optical axis of the second lens unit and the third lens unit at the telephoto end with reference to the wide angle end are represented by m2 and m3, respectively. Lateral magnifications of the fourth lens unit at the wide angle end and the telephoto end are represented by β4$w$ and β4$t$, respectively. A focal length of the first lens unit is represented by f1. A focal length of the entire lens system at the telephoto end is represented by ft. Air intervals between the third lens unit and the fourth lens unit at the wide angle end and the telephoto end are represented by L34$w$ and L34$t$, respectively.

At this time, it is preferred to satisfy at least one of the following conditions:

$$1.90 < |m2/m3| < 3.00 \quad (3);$$

$$0.70 < β4t/β4w < 1.05 \quad (4);$$

$$3.30 < ft/f1 < 5.50 \quad (5); \text{ and}$$

$$1.00 < L34t/L34w < 200.00 \quad (6).$$

Conditional Expression (3) defines a ratio of the positions m2 and m3 of the second lens unit and the third lens unit in the optical axis direction at the telephoto end with reference to the wide angle end.

Conditional Expression (3) is satisfied to facilitate attainment of both the high magnification ratio and the reductions in size and weight of the lens.

When the upper limit condition of Conditional Expression (3) is not satisfied, the amount of displacement of the second lens unit to the image side becomes too large, which makes it hard to suppress the variations in aberrations due to the zooming.

When the lower limit condition of Conditional Expression (3) is not satisfied, the effect of increasing the magnification ratio of the second lens unit cannot be obtained, which makes it hard to suppress the increase in overall lens length accompanying the increases in amounts of movement of the moving lens units in attaining the high magnification ratio.

Conditional Expression (4) defines a value obtained by dividing the lateral magnification β4t of the fourth lens unit at the telephoto end by the lateral magnification β4w of the fourth lens unit at the wide angle end. Conditional Expression (4) is satisfied to facilitate attainment of both the high magnification ratio and the reductions in size and weight of the lens.

When the upper limit condition of Conditional Expression (4) is not satisfied, the fourth lens unit is displaced to the image side at the telephoto end with reference to the wide angle end, which increases the overall lens length.

When the lower limit condition of Conditional Expression (4) is not satisfied, the amount of displacement of the second lens unit cannot be increased, which makes it hard to attain both the high magnification ratio and the reduction in overall lens length.

Conditional Expression (5) defines a value obtained by dividing the focal length ft of the entire lens system at the telephoto end by the focal length f1 of the first lens unit. Conditional Expression (5) is satisfied to facilitate attainment of both the reduction in overall lens length and the correction of the aberrations on the telephoto side.

When the upper limit condition of Conditional Expression (5) is not satisfied, the focal length of the first lens unit becomes relatively short, and the magnification of the aberrations on the telephoto side becomes large, which makes it hard to suppress variations in axial chromatic aberration and spherical aberration.

When the lower limit condition of Conditional Expression (5) is not satisfied, the focal length of the first lens unit becomes relatively too long, which makes it difficult to reduce the size of the first lens unit and hence makes it hard to reduce the size and weight of the entire lens system.

Conditional Expression (6) defines a value obtained by dividing the air interval L34t between the third lens unit and the fourth lens unit at the telephoto end by the air interval L34w between the third lens unit and the fourth lens unit at the wide angle end. Conditional Expression (6) is satisfied to facilitate attainment of both the reduction in overall lens length and the high magnification ratio.

When the upper limit condition of Conditional Expression (6) is not satisfied, the fourth lens unit is displaced to the image side at the telephoto end with reference to the wide angle end, which increases the overall lens length.

When the lower limit condition of Conditional Expression (6) is not satisfied, the amount of displacement of the second lens unit cannot be increased, which makes it hard to attain both the high magnification ratio and the reduction in overall lens length.

It is further preferred to set numerical ranges of Conditional Expressions (3) to (6) as follows:

$$2.05 < |m2/m3| < 2.90 \quad (3a);$$

$$0.72 < \beta 4t/\beta 4w < 0.98 \quad (4a);$$

$$3.50 < ft/f1 < 4.50 \quad (5a); \text{ and}$$

$$20.00 < L34t/L34w < 180.00 \quad (6a).$$

Now, features of the lens configurations of the zoom lens according to Numerical Embodiments 1 to 7 of the present invention are described.

[Embodiment 1]

A description is given of the second lens unit U2, the third lens unit U3, and the fourth lens unit U4, which are lens units which move during zooming in Embodiment 1 corresponding to Numerical Embodiment 1. The second lens unit U2 corresponds to the 11th to 17th lens surfaces in Numerical Embodiment 1, and includes, in order from the object side to the image side, a negative lens, a cemented lens formed by bonding a negative lens and a positive lens in the stated order, and a negative lens. The third lens unit U3 corresponds to the 18th to 24th lens surfaces in Numerical Embodiment 1, and includes, in order from the object side to the image side, two positive lenses, and a cemented lens formed by bonding a negative lens and a positive lens in the stated order. The fourth lens unit U4 corresponds to the 25th to 27th lens surfaces in Numerical Embodiment 1, and includes, in order from the object side to the image side, a cemented lens formed by bonding a negative lens and a positive lens in the stated order. Aspherical surfaces are used for the 11th, 19th, and 25th lens surfaces, of which the 11th lens surface corrects a distortion mainly on the wide angle side, the 19th lens surface corrects off-axial aberrations such as a coma on the wide angle side, and the 25th lens surface corrects the spherical aberration on the telephoto side.

Corresponding values of the conditional expressions in this embodiment are shown in Table 1. This numerical embodiment satisfies all the conditional expressions to attain both the high magnification ratio of 115 and the reduction in size while attaining satisfactory optical performance.

[Embodiment 2]

A description is given of the second lens unit U2, the third lens unit U3, and the fourth lens unit U4, which are lens units which move during zooming in Embodiment 2 corresponding to Numerical Embodiment 2. The second lens unit U2 corresponds to the 11th to 17th lens surfaces in Numerical Embodiment 2, and includes, in order from the object side to the image side, a negative lens, a cemented lens formed by bonding a negative lens and a positive lens in the stated order, and a negative lens. The third lens unit U3 corresponds to the 18th to 24th lens surfaces in Numerical Embodiment 2, and includes, in order from the object side to the image side, two positive lenses, and a cemented lens formed by bonding a negative lens and a positive lens in the stated order. The fourth lens unit U4 corresponds to the 25th and 26th lens surfaces in Numerical Embodiment 2, and includes a single positive lens. Aspherical surfaces are used for the 11th, 19th, and 25th lens surfaces, of which the 11th lens surface corrects the distortion mainly on the wide angle side, the 19th lens surface corrects the off-axial aberrations such as the coma on the wide angle side, and the 25th lens surface corrects the spherical aberration on the telephoto side.

Corresponding values of the conditional expressions in this embodiment are shown in Table 1. This numerical embodiment satisfies all the conditional expressions to attain both the high magnification ratio of 100 and the reduction in size while attaining satisfactory optical performance even with the fourth lens unit including the single positive lens.

[Embodiment 3]

A description is given of the second lens unit U2, the third lens unit U3, and the fourth lens unit U4, which move during zooming in Embodiment 3 corresponding to Numerical Embodiment 3. The second lens unit U2 corresponds to the 11th to 17th lens surfaces in Numerical Embodiment 3, and includes, in order from the object side to the image side, a negative lens, a cemented lens formed by bonding a negative lens and a positive lens in the stated order, and a negative lens. The third lens unit U3 corresponds to the 18th to 24th lens surfaces in Numerical Embodiment 3, and includes, in order from the object side to the image side, two positive lenses, and a cemented lens formed by bonding a negative lens and a positive lens in the stated order. The fourth lens unit U4 corresponds to the 25th to 28th lens surfaces in Numerical Embodiment 3, and includes, in order from the object side to the image side, a single negative lens and a single positive lens. Aspherical surfaces are used for the 11th, 19th, and 25th lens surfaces, of which the 11th lens surface corrects the distortion mainly on the wide angle side, the 19th lens surface corrects the off-axial aberrations such as the coma on the wide angle side, and the 25th lens surface corrects the spherical aberration on the telephoto side.

Corresponding values of the conditional expressions in this embodiment are shown in Table 1. This numerical embodiment satisfies all the conditional expressions to attain both the high magnification ratio of 120 and the reduction in size while attaining satisfactory optical performance.

[Embodiment 4]

Embodiment 4 corresponding to Numerical Embodiment 4 employs a similar configuration as that of Embodiment 1. Aspherical surfaces are used for the 11th, 19th, and 25th lens surfaces, of which the 11th lens surface corrects the distortion mainly on the wide angle side, the 19th lens surface corrects the off-axial aberrations such as the coma on the wide angle side, and the 25th lens surface corrects the spherical aberration on the telephoto side. This numerical embodiment satisfies all the conditional expressions as shown in Table 1 to attain both the high magnification ratio of 115 and the reduction in size while attaining satisfactory optical performance.

[Embodiment 5]

Embodiment 5 corresponding to Numerical Embodiment 5 employs a similar configuration as that of Embodiment 2. Aspherical surfaces are used for the 11th, 19th, and 25th lens surfaces, of which the 11th lens surface corrects the distortion mainly on the wide angle side, the 19th lens surface corrects the off-axial aberrations such as the coma on the wide angle side, and the 25th lens surface corrects the spherical aberration on the telephoto side. This numerical embodiment satisfies all the conditional expressions as shown in Table 1 to attain both the high magnification ratio of 135 and the reduction in size while attaining satisfactory optical performance even with the fourth lens unit including the single positive lens.

[Embodiment 6]

Embodiment 6 corresponding to Numerical Embodiment 6 employs a similar configuration as that of Embodiment 3. Aspherical surfaces are used for the 11th, 19th, and 25th lens surfaces, of which the 11th lens surface corrects the distortion mainly on the wide angle side, the 19th lens surface corrects the off-axial aberrations such as the coma on the wide angle side, and the 25th lens surface corrects the spherical aberration on the telephoto side. This numerical embodiment satisfies the conditional expressions (1) to (3), (5), and (6) as shown in Table 1 to attain both the high magnification ratio of 120 and the reduction in size while attaining satisfactory optical performance.

[Embodiment 7]

A description is given of the second lens unit U2, the third lens unit U3, and the fourth lens unit U4, which move during zooming in Embodiment 7 corresponding to Numerical Embodiment 7. The second lens unit U2 corresponds to the 20th to 26th lens surfaces in Numerical Embodiment 7, and includes, in order from the object side to the image side, a negative lens, a cemented lens formed by bonding a positive lens and a negative lens in the stated order, and a negative lens. The third lens unit U3 corresponds to the 27th to 33rd lens surfaces in Numerical Embodiment 7, and includes, in order from the object side to the image side, two positive lenses, and a cemented lens formed by bonding a negative lens and a positive lens in the stated order. The fourth lens unit U4 corresponds to the 34th and 35th lens surfaces in Numerical Embodiment 7, and includes a single positive lens. Aspherical surfaces are used for the 20th, 28th, and 34th lens surfaces, of which the 20th lens surface corrects a distortion mainly on the telephoto side, the 28th lens surface corrects the off-axial aberrations such as the coma on the wide angle side, and the 34th lens surface corrects the spherical aberration on the telephoto side.

Corresponding values of the conditional expressions in this embodiment are shown in Table 1. This numerical embodiment satisfies the conditional expressions (1) to (3) and (6) to attain both the high magnification ratio of 28 and the reduction in size while attaining satisfactory optical performance.

Figure 17:
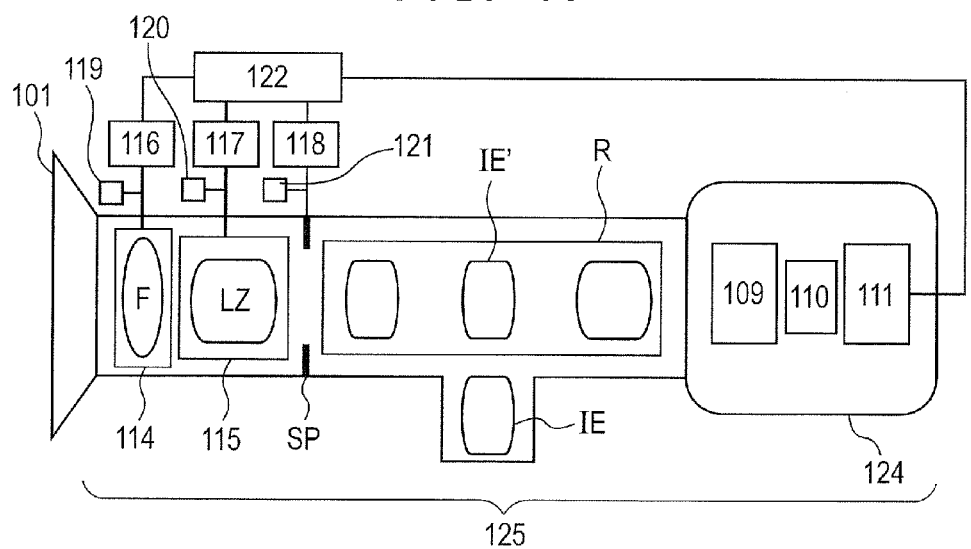
FIG. 17 is a schematic diagram of a main part of an image pickup apparatus according to the present invention.

FIG. 17 is a schematic diagram of a main part of an image pickup apparatus (television camera system) using the zoom lens according to each of Embodiments 1 to 7 of the present invention as a photographing optical system. In FIG. 17, an image pickup apparatus 125 includes a zoom lens 101 according to any one of Embodiments 1 to 7, and a camera 124. The zoom lens 101 is detachably mounted to the camera 124. The camera 124 mounted with the zoom lens 101 constitutes the image pickup apparatus 125. The zoom lens 101 includes a first lens unit F, a zoom portion LZ, and a fifth lens unit R for imaging. The first lens unit F includes a lens unit for focusing.

The zoom portion LZ includes the second lens unit and the third lens unit which move on the optical axis for zooming, and the fourth lens unit which moves on the optical axis for correcting the image plane variation accompanying the zooming. The aperture stop is denoted by SP. The fifth lens unit R includes lens units IE' and IE which can be inserted into and removed from an optical path. The lens units IE and IE' are switched to displace the focal length range of the entire system of the zoom lens 101. Drive mechanisms 114 and 115, such as a helicoid and a cam, drive the first lens unit F and the zoom portion LZ in the optical axis direction, respectively. Motors (drive units) 116 to 118 electrically drive the drive mechanisms 114 and 115 and the aperture stop SP.

Detectors 119 to 121, such as an encoder, a potentiometer, or a photo-sensor, are configured to detect the positions of the first lens unit F and the zoom portion LZ on the optical axis, and the aperture diameter of the aperture stop SP. The camera 124 includes a glass block 109, which corresponds to an optical filter or a color separation optical system provided within the camera 124. Further, the camera 124 includes a solid-state image pickup element (photoelectric transducer) 110, such as a charge-coupled device (CCD) sensor or a complementary metal-oxide semiconductor (CMOS) sensor. The solid-state image pickup element 110 is configured to receive a subject image formed by the zoom lens 101. Further, central processing units (CPUs) 111 and 122 control the driving of the camera 124 and the zoom lens 101.

By applying the zoom lens according to the present invention to a television camera as described above, an image pickup apparatus having high optical performance may be realized.

The exemplary embodiments of the present invention are described above, but the present invention is not limited to these embodiments and can be modified and changed variously within the scope of the gist thereof.

Next, Numerical Embodiments 1 to 7 corresponding to Embodiments 1 to 7 of the present invention are shown below. In each of the numerical embodiments, represents the order of a surface from the object side, "ri" represents a radius of curvature of an i-th surface from the object side, "di" represents an interval between the i-th surface and the (i+1)th surface from the object side, and "ndi" and "udi" respectively represent a refractive index and an Abbe constant of the i-th optical member. The final three surfaces include a glass block such as a filter. The focal length, the F-number, and the angle of field represent values when focused on the object at infinity. BF is an equivalent air value of a distance from the final surface of the glass block to the image plane.

Note that, the aspherical shape is expressed by the following expression:

$$x=(y^2/r)/\{1+(1-kxy^2/r^2)^{0.5}\}+A2xy^2+A3xy^3+A4xy^4+A5xy^5+A6xy^6+A7xy^7+A8xy^8+A9xy^9+A10xy^{10}+A11xy^{11}+A12xy^{12}$$

where x is a coordinate in the optical axis direction; y is a coordinate in a direction perpendicular to the optical axis; r is a standard radius of curvature; k is a conic constant; and An is an n-th order aspherical coefficient. "e-x" means "×10$^{-x}$". Note that, the lens surfaces having the aspherical surfaces are marked with asterisks (*) on the left side of surface numbers in the tables.

Correspondences between the embodiments and the conditional expressions described above are shown in Table 1.

[Numerical Embodiment 1]

Unit: mm

Surface data

| Surface number | r | d | nd | vd | Effective diameter |
|---|---|---|---|---|---|
| 1 | 3985.747 | 6.00 | 1.83400 | 37.2 | 206.45 |
| 2 | 345.219 | 2.24 | | | 199.19 |
| 3 | 350.731 | 25.92 | 1.43387 | 95.1 | 198.83 |
| 4 | −634.409 | 27.72 | | | 197.65 |
| 5 | 329.460 | 19.51 | 1.43387 | 95.1 | 197.70 |
| 6 | −4308.249 | 0.25 | | | 197.24 |
| 7 | 260.932 | 19.16 | 1.43387 | 95.1 | 192.72 |
| 8 | 1950.635 | 1.20 | | | 191.51 |
| 9 | 213.609 | 14.00 | 1.49700 | 81.5 | 181.41 |
| 10 | 393.837 | (Variable) | | | 178.73 |
| 11* | 20598.048 | 2.20 | 2.00330 | 28.3 | 45.13 |
| 12 | 44.632 | 8.84 | | | 39.64 |
| 13 | −66.973 | 1.40 | 1.88300 | 40.8 | 38.77 |
| 14 | 52.127 | 8.74 | 1.95906 | 17.5 | 38.54 |
| 15 | −73.546 | 1.53 | | | 38.39 |
| 16 | −54.749 | 1.60 | 1.90366 | 31.3 | 37.89 |
| 17 | −582.266 | (Variable) | | | 38.44 |
| 18 | 128.983 | 9.05 | 1.59282 | 68.6 | 75.47 |
| 19* | −440.727 | 0.50 | | | 75.89 |
| 20 | 123.132 | 14.63 | 1.59282 | 68.6 | 77.94 |
| 21 | −154.849 | 0.20 | | | 77.69 |
| 22 | 133.822 | 2.50 | 1.80518 | 25.4 | 73.06 |
| 23 | 56.533 | 17.88 | 1.43875 | 94.9 | 68.54 |
| 24 | −212.021 | (Variable) | | | 67.58 |
| 25* | 198.349 | 3.50 | 1.66680 | 33.0 | 63.53 |
| 26 | 103.927 | 7.48 | 1.64000 | 60.1 | 61.01 |
| 27 | −8144.734 | (Variable) | | | 59.73 |
| 28 (Stop) | ∞ | 2.88 | | | 29.71 |
| 29 | −98.274 | 1.40 | 1.81600 | 46.6 | 28.27 |
| 30 | 23.407 | 0.20 | | | 26.57 |
| 31 | 23.936 | 5.69 | 1.80809 | 22.8 | 26.66 |
| 32 | 390.280 | 5.26 | | | 26.22 |
| 33 | −63.075 | 1.40 | 1.88300 | 40.8 | 24.74 |
| 34 | 89.459 | 19.95 | | | 24.71 |
| 35 | −196.119 | 1.80 | 1.64000 | 60.1 | 29.05 |
| 36 | 94.860 | 3.94 | 1.84666 | 23.8 | 29.75 |
| 37 | 126.948 | 3.03 | | | 30.26 |
| 38 | 1201.962 | 7.00 | 1.48749 | 70.2 | 31.34 |
| 39 | −34.275 | 0.20 | | | 32.23 |
| 40 | −622.792 | 1.60 | 1.88300 | 40.8 | 32.04 |
| 41 | 37.272 | 9.92 | 1.49700 | 81.5 | 32.04 |
| 42 | −49.934 | 0.20 | | | 32.95 |
| 43 | 160.862 | 8.66 | 1.54814 | 45.8 | 33.11 |
| 44 | −34.283 | 1.60 | 1.88300 | 40.8 | 32.94 |
| 45 | −144.347 | 0.20 | | | 33.69 |
| 46 | 95.118 | 10.08 | 1.48749 | 70.2 | 34.01 |
| 47 | −41.802 | 14.00 | | | 34.22 |
| 48 | ∞ | 33.00 | 1.60859 | 46.4 | 60.00 |
| 49 | ∞ | 13.20 | 1.51633 | 64.2 | 60.00 |
| 50 | ∞ | (BF) | | | 60.00 |
| Image plane | ∞ | | | | |

Aspherical Surface data

Eleventh surface

K = −4.15562e+006   A4 = 6.03842e−007   A6 = −2.92255e−010
A8 = 1.02124e−013

Nineteenth surface

K = −7.33314e+001   A4 = 4.79311e−007   A6 = 3.65689e−011
A8 = −1.99253e−015

Twenty-fifth surface

K = 1.92273e+000   A4 = −7.93312e−008   A6 = −2.43104e−011
A8 = 7.41843e−015

Various data
Zoom ratio 115.00

| | Wide angle | Intermidiate | Telephoto |
|---|---|---|---|
| Focal length | 8.90 | 90.00 | 1023.50 |
| F-number | 1.80 | 1.80 | 5.30 |
| Half angle of field | 31.72 | 3.50 | 0.31 |
| Image height | 5.50 | 5.50 | 5.50 |
| Total lens length | 637.06 | 637.06 | 637.06 |
| BF | 11.98 | 11.98 | 11.98 |
| d10 | 2.82 | 157.56 | 206.43 |
| d17 | 277.24 | 97.34 | 2.00 |
| d24 | 0.78 | 10.55 | 59.46 |
| d27 | 3.00 | 18.39 | 15.96 |
| Entrance pupil position | 129.62 | 986.39 | 13916.45 |
| Exit pupil position | 145.41 | 145.41 | 145.41 |
| Front principal point position | 139.12 | 1137.10 | 22791.17 |
| Rear principal point position | 3.08 | −78.02 | −1011.52 |

-continued

Unit: mm

Zoom lens unit data

| Unit | Leading surface | Focal length | Lens structure length | Front principal point position | Rear principal point position |
|---|---|---|---|---|---|
| 1 | 1 | 266.03 | 116.01 | 66.77 | −19.51 |
| 2 | 11 | −25.32 | 24.31 | 4.84 | −11.48 |
| 3 | 18 | 66.26 | 44.75 | 9.10 | −21.59 |
| 4 | 25 | 313.91 | 10.98 | −0.02 | −6.67 |
| 5 | 28 | 35.40 | 145.19 | 49.87 | 23.34 |

Single lens data

| Lens | Leading surface | Focal length |
|---|---|---|
| 1 | 1 | −450.65 |
| 2 | 3 | 523.45 |
| 3 | 5 | 704.54 |
| 4 | 7 | 690.17 |
| 5 | 9 | 912.87 |
| 6 | 11 | −44.21 |
| 7 | 13 | −32.82 |
| 8 | 14 | 32.50 |
| 9 | 16 | −66.47 |
| 10 | 18 | 168.73 |
| 11 | 20 | 117.61 |
| 12 | 22 | −122.22 |
| 13 | 23 | 103.58 |
| 14 | 25 | −330.00 |
| 15 | 26 | 159.76 |
| 16 | 29 | −22.93 |
| 17 | 31 | 31.02 |
| 18 | 33 | −41.47 |
| 19 | 35 | −99.26 |
| 20 | 36 | 415.42 |
| 21 | 38 | 68.25 |
| 22 | 40 | −39.55 |
| 23 | 41 | 44.50 |
| 24 | 43 | 52.11 |
| 25 | 44 | −50.97 |
| 26 | 46 | 60.84 |

[Numerical Embodiment 2]

Unit: mm

Surface data

| Surface number | r | d | nd | vd | Effective diameter |
|---|---|---|---|---|---|
| 1 | 8000.000 | 6.00 | 1.83400 | 37.2 | 203.14 |
| 2 | 373.691 | 1.54 | | | 196.31 |
| 3 | 361.776 | 26.52 | 1.43387 | 95.1 | 195.88 |
| 4 | −518.580 | 25.95 | | | 194.76 |
| 5 | 370.520 | 17.79 | 1.43387 | 95.1 | 195.86 |
| 6 | −3369.467 | 0.25 | | | 195.38 |
| 7 | 241.028 | 17.39 | 1.43387 | 95.1 | 190.27 |
| 8 | 861.689 | 1.20 | | | 189.00 |
| 9 | 203.790 | 14.06 | 1.49700 | 81.5 | 180.28 |
| 10 | 421.379 | (Variable) | | | 178.55 |
| 11* | 3657.872 | 2.20 | 2.00330 | 28.3 | 43.68 |
| 12 | 40.621 | 10.00 | | | 38.06 |
| 13 | −45.369 | 1.40 | 1.88300 | 40.8 | 37.28 |
| 14 | 98.142 | 5.97 | 1.95906 | 17.5 | 38.21 |
| 15 | −67.097 | 0.69 | | | 38.35 |
| 16 | −64.854 | 1.60 | 1.75500 | 52.3 | 38.11 |
| 17 | −212.532 | (Variable) | | | 38.81 |
| 18 | 140.986 | 10.25 | 1.56907 | 71.3 | 73.95 |
| 19* | −186.006 | 0.50 | | | 74.45 |
| 20 | 102.215 | 13.53 | 1.56907 | 71.3 | 76.54 |
| 21 | −162.778 | 0.20 | | | 76.28 |
| 22 | 159.988 | 2.50 | 1.84666 | 23.8 | 71.24 |
| 23 | 60.722 | 13.35 | 1.43875 | 94.9 | 66.81 |
| 24 | −6797.000 | (Variable) | | | 65.80 |
| 25* | 254.766 | 5.14 | 1.60311 | 60.6 | 64.51 |
| 26 | −369.734 | (Variable) | | | 63.83 |
| 27 (Stop) | ∞ | 2.93 | | | 33.88 |
| 28 | −155.154 | 1.40 | 1.83481 | 42.7 | 32.37 |
| 29 | 24.535 | 6.89 | 1.76182 | 26.5 | 30.31 |
| 30 | 2780.241 | 3.70 | | | 29.93 |
| 31 | −96.909 | 1.85 | 1.83481 | 42.7 | 28.91 |
| 32 | 71.731 | 0.15 | | | 28.60 |
| 33 | 33.014 | 4.69 | 1.84666 | 23.8 | 29.04 |
| 34 | 155.745 | 5.42 | | | 28.39 |
| 35 | −122.347 | 1.58 | 1.83481 | 42.7 | 26.53 |
| 36 | 58.258 | 7.24 | | | 25.99 |
| 37 | −72.547 | 1.91 | 1.71736 | 29.5 | 26.54 |
| 38 | 34.123 | 15.00 | 1.65160 | 58.5 | 27.93 |
| 39 | −50.824 | 3.00 | | | 30.61 |
| 40 | −403.126 | 4.32 | 1.54814 | 45.8 | 30.86 |
| 41 | −47.125 | 3.12 | | | 30.98 |
| 42 | −68.761 | 3.07 | 1.88300 | 40.8 | 29.74 |
| 43 | 37.681 | 9.19 | 1.51742 | 52.4 | 30.16 |
| 44 | −49.851 | 0.20 | | | 31.18 |
| 45 | 164.690 | 7.05 | 1.49700 | 81.5 | 31.54 |
| 46 | −34.793 | 2.50 | 1.83481 | 42.7 | 31.55 |
| 47 | −98.072 | 1.18 | | | 32.48 |
| 48 | 69.220 | 7.25 | 1.54814 | 45.8 | 32.77 |
| 49 | −56.118 | 14.45 | | | 32.39 |
| 50 | ∞ | 33.00 | 1.60859 | 46.4 | 60.00 |
| 51 | ∞ | 13.20 | 1.51633 | 64.2 | 60.00 |
| 52 | ∞ | (BF) | | | 60.00 |
| Image plane | ∞ | | | | |

Aspherical Surface data

Eleventh surface

K = −9.90196e+004  A4 = 1.00187e−006  A6 = −7.44468e−010
A8 = 5.01326e−013

Nineteenth surface

K = −1.87503e+001  A4 = 2.45550e−007  A6 = 7.82502e−011
A8 = −3.75504e−015

Twenty-fifth surface

K = 1.36886e+001  A4 = −1.59307e−007  A6 = −1.02866e−010
A8 = 3.28743e−015

Various data
Zoom ratio 100.00

| | Wide angle | Intermidiate | Telephoto |
|---|---|---|---|
| Focal length | 8.90 | 85.00 | 890.00 |
| F-number | 1.80 | 1.80 | 4.60 |
| Half angle of field | 31.72 | 3.70 | 0.35 |
| Image height | 5.50 | 5.50 | 5.50 |
| Total lens length | 616.09 | 616.09 | 616.09 |
| BF | 10.69 | 10.69 | 10.69 |
| d10 | 2.71 | 151.20 | 198.10 |
| d17 | 269.28 | 96.90 | 1.99 |
| d24 | 0.22 | 5.24 | 27.64 |
| d26 | 0.86 | 19.73 | 45.35 |
| Entrance pupil position | 124.84 | 917.05 | 9476.01 |
| Exit pupil position | 152.70 | 152.70 | 152.70 |
| Front principal point position | 134.30 | 1052.93 | 15943.77 |
| Rear principal point position | 1.79 | −74.30 | −879.30 |

-continued

Unit: mm

Zoom lens unit data

| Unit | Leading surface | Focal length | Lens structure length | Front principal point position | Rear principal point position |
|---|---|---|---|---|---|
| 1 | 1 | 259.25 | 110.70 | 62.07 | −20.39 |
| 2 | 11 | −25.74 | 21.85 | 3.58 | −12.51 |
| 3 | 18 | 69.30 | 40.33 | 5.79 | −20.84 |
| 4 | 25 | 249.89 | 5.14 | 1.31 | −1.90 |
| 5 | 27 | 40.10 | 154.30 | 57.57 | 20.54 |

Single lens data

| Lens | Leading surface | Focal length |
|---|---|---|
| 1 | 1 | −467.21 |
| 2 | 3 | 494.58 |
| 3 | 5 | 768.56 |
| 4 | 7 | 762.85 |
| 5 | 9 | 775.10 |
| 6 | 11 | −40.62 |
| 7 | 13 | −34.77 |
| 8 | 14 | 41.75 |
| 9 | 16 | −123.64 |
| 10 | 18 | 142.08 |
| 11 | 20 | 112.04 |
| 12 | 22 | −115.80 |
| 13 | 23 | 136.91 |
| 14 | 25 | 249.89 |
| 15 | 28 | −25.15 |
| 16 | 29 | 32.17 |
| 17 | 31 | −48.86 |
| 18 | 33 | 48.15 |
| 19 | 35 | −46.83 |
| 20 | 37 | −31.86 |
| 21 | 38 | 33.55 |
| 22 | 40 | 96.43 |
| 23 | 42 | −27.04 |
| 24 | 43 | 42.83 |
| 25 | 45 | 58.31 |
| 26 | 46 | −65.41 |
| 27 | 48 | 57.43 |

[Numerical Embodiment 3]

Unit: mm

Surface data

| Surface number | r | d | nd | vd | Effective diameter |
|---|---|---|---|---|---|
| 1 | 7496.258 | 6.00 | 1.83400 | 37.2 | 201.64 |
| 2 | 344.164 | 2.23 | | | 194.71 |
| 3 | 349.736 | 25.87 | 1.43387 | 95.1 | 194.38 |
| 4 | −565.439 | 26.59 | | | 194.29 |
| 5 | 326.652 | 19.74 | 1.43387 | 95.1 | 197.77 |
| 6 | −4043.556 | 0.25 | | | 197.31 |
| 7 | 249.968 | 20.07 | 1.43387 | 95.1 | 192.58 |
| 8 | 1915.030 | 1.20 | | | 191.30 |
| 9 | 211.501 | 14.00 | 1.49700 | 81.5 | 180.86 |
| 10 | 386.419 | (Variable) | | | 178.09 |
| 11* | 22316.175 | 2.20 | 2.00330 | 28.3 | 46.39 |
| 12 | 50.780 | 7.94 | | | 41.12 |
| 13 | −86.174 | 1.40 | 1.88300 | 40.8 | 40.21 |
| 14 | 47.377 | 8.21 | 1.95906 | 17.5 | 39.13 |
| 15 | −117.264 | 2.50 | | | 38.74 |
| 16 | −61.921 | 1.60 | 1.78590 | 44.2 | 37.93 |
| 17 | 285.780 | (Variable) | | | 38.28 |
| 18 | 158.865 | 11.03 | 1.59240 | 68.3 | 78.58 |
| 19* | −205.280 | 0.50 | | | 79.13 |
| 20 | 157.989 | 11.74 | 1.59282 | 68.6 | 80.47 |
| 21 | −254.407 | 0.20 | | | 80.13 |
| 22 | 108.777 | 2.50 | 1.84666 | 23.8 | 76.38 |
| 23 | 58.188 | 17.69 | 1.43875 | 94.9 | 72.04 |
| 24 | −397.524 | (Variable) | | | 71.06 |
| 25* | 176.188 | 3.50 | 1.66680 | 33.0 | 68.27 |
| 26 | 95.351 | 0.14 | | | 65.59 |
| 27 | 97.403 | 8.53 | 1.64000 | 60.1 | 65.59 |
| 28 | 5811.627 | (Variable) | | | 64.32 |
| 29 (Stop) | ∞ | 2.82 | | | 31.83 |
| 30 | −119.198 | 1.40 | 1.81600 | 46.6 | 30.49 |
| 31 | 35.774 | 0.20 | | | 29.08 |
| 32 | 32.391 | 4.90 | 1.80809 | 22.8 | 29.24 |
| 33 | 292.767 | 6.10 | | | 28.70 |
| 34 | −51.576 | 1.40 | 1.88300 | 40.8 | 26.76 |
| 35 | −237.871 | 2.54 | | | 26.79 |
| 36 | −65.994 | 1.80 | 1.75500 | 52.3 | 26.66 |
| 37 | 117.420 | 3.80 | 1.84666 | 23.8 | 27.19 |
| 38 | 2376.520 | 3.03 | | | 27.53 |
| 39 | ∞ | 14.24 | 1.62041 | 60.3 | 28.19 |
| 40 | 148.949 | 6.17 | | | 30.21 |
| 41 | 1450.149 | 6.97 | 1.48749 | 70.2 | 32.15 |
| 42 | −36.614 | 0.20 | | | 32.84 |
| 43 | −241.417 | 1.60 | 1.88300 | 40.8 | 32.32 |
| 44 | 42.402 | 9.66 | 1.49700 | 81.5 | 32.24 |
| 45 | −44.507 | 0.20 | | | 32.90 |
| 46 | 434.659 | 8.74 | 1.56732 | 42.8 | 32.57 |
| 47 | −26.401 | 1.60 | 1.88300 | 40.8 | 32.32 |
| 48 | −112.145 | 0.20 | | | 33.40 |
| 49 | 85.248 | 7.85 | 1.48749 | 70.2 | 33.65 |
| 50 | −43.428 | 14.00 | | | 33.43 |
| 51 | ∞ | 33.00 | 1.60859 | 46.4 | 60.00 |
| 52 | ∞ | 13.20 | 1.51633 | 64.2 | 60.00 |
| 53 | ∞ | (BF) | | | 60.00 |
| Image plane | ∞ | | | | |

Aspherical Surface data

Eleventh surface

K = −4.15562e+006  A4 = 5.49974e−007  A6 = −1.72378e−010
A8 = 3.80646e−014

Nineteenth surface

K = −2.05037e+001  A4 = −2.80466e−008  A6 = 5.63081e−011
A8 = −5.33471e−015

Twenty-fifth surface

K = 4.98959e+000  A4 = −1.20669e−007  A6 = −4.00844e−011
A8 = 6.62094e−015

Various data
Zoom ratio 120.00

| | Wide angle | Intermidiate | Telephoto |
|---|---|---|---|
| Focal length | 9.00 | 90.00 | 1080.00 |
| F-number | 1.80 | 1.80 | 5.60 |
| Half angle of field | 31.43 | 3.50 | 0.29 |
| Image height | 5.50 | 5.50 | 5.50 |
| Total lens length | 640.68 | 640.68 | 640.68 |
| BF | 11.97 | 11.97 | 11.97 |
| d10 | 2.83 | 152.47 | 199.72 |
| d17 | 281.46 | 103.52 | 1.99 |
| d24 | 0.20 | 9.97 | 35.19 |
| d28 | 3.00 | 21.53 | 50.59 |
| Entrance pupil position | 130.95 | 971.56 | 14210.01 |
| Exit pupil position | 240.54 | 240.54 | 240.54 |
| Front principal point position | 140.31 | 1097.00 | 20392.98 |
| Rear principal point position | 2.97 | −78.03 | −1068.02 |

-continued

Unit: mm

Zoom lens unit data

| Unit | Leading surface | Focal length | Lens structure length | Front principal point position | Rear principal point position |
|---|---|---|---|---|---|
| 1 | 1 | 260.40 | 115.95 | 66.13 | −19.56 |
| 2 | 11 | −25.01 | 23.84 | 6.14 | −9.62 |
| 3 | 18 | 71.80 | 43.65 | 8.20 | −21.13 |
| 4 | 25 | 306.37 | 12.17 | −0.25 | −7.67 |
| 5 | 29 | 44.44 | 145.61 | 55.86 | 23.20 |

Single lens data

| Lens | Leading surface | Focal length |
|---|---|---|
| 1 | 1 | −429.95 |
| 2 | 3 | 501.08 |
| 3 | 5 | 695.81 |
| 4 | 7 | 658.56 |
| 5 | 9 | 913.06 |
| 6 | 11 | −50.31 |
| 7 | 13 | −34.25 |
| 8 | 14 | 35.59 |
| 9 | 16 | −64.28 |
| 10 | 18 | 152.37 |
| 11 | 20 | 165.59 |
| 12 | 22 | −149.74 |
| 13 | 23 | 116.78 |
| 14 | 25 | −314.94 |
| 15 | 27 | 154.08 |
| 16 | 30 | −33.41 |
| 17 | 32 | 44.24 |
| 18 | 34 | −74.41 |
| 19 | 36 | −55.47 |
| 20 | 37 | 144.35 |
| 21 | 39 | −239.14 |
| 22 | 41 | 73.12 |
| 23 | 43 | −40.50 |
| 24 | 44 | 45.24 |
| 25 | 46 | 43.93 |
| 26 | 47 | −39.22 |
| 27 | 49 | 60.02 |

[Numerical Embodiment 4]

Unit: mm

Surface data

| Surface number | r | d | nd | vd | Effective diameter |
|---|---|---|---|---|---|
| 1 | 5793.014 | 6.00 | 1.83400 | 37.2 | 208.89 |
| 2 | 342.037 | 2.32 | | | 199.75 |
| 3 | 349.174 | 26.52 | 1.43387 | 95.1 | 199.46 |
| 4 | −605.233 | 26.73 | | | 198.38 |
| 5 | 325.511 | 20.05 | 1.43387 | 95.1 | 198.44 |
| 6 | −3616.038 | 0.25 | | | 197.99 |
| 7 | 256.834 | 19.77 | 1.43387 | 95.1 | 193.35 |
| 8 | 2109.250 | 1.20 | | | 192.13 |
| 9 | 212.141 | 14.00 | 1.49700 | 81.5 | 181.65 |
| 10 | 398.858 | (Variable) | | | 179.13 |
| 11* | 16798.456 | 2.20 | 2.00330 | 28.3 | 53.09 |
| 12 | 69.079 | 8.47 | | | 47.57 |
| 13 | −91.374 | 1.40 | 1.88300 | 40.8 | 46.07 |
| 14 | 53.825 | 10.48 | 1.95906 | 17.5 | 43.78 |
| 15 | −72.949 | 1.94 | | | 43.06 |
| 16 | −52.818 | 1.60 | 1.90366 | 31.3 | 41.50 |
| 17 | 137.854 | (Variable) | | | 40.31 |
| 18 | 140.805 | 9.33 | 1.59282 | 68.6 | 69.73 |
| 19* | −462.549 | 0.50 | | | 70.27 |
| 20 | 161.166 | 10.80 | 1.59282 | 68.6 | 71.26 |
| 21 | −184.359 | 0.20 | | | 71.08 |
| 22 | 113.121 | 2.50 | 1.80518 | 25.4 | 68.14 |
| 23 | 56.598 | 14.32 | 1.43875 | 94.9 | 64.71 |
| 24 | −1547.770 | (Variable) | | | 63.77 |
| 25* | 159.862 | 3.50 | 1.66680 | 33.0 | 60.82 |
| 26 | 90.866 | 8.06 | 1.64000 | 60.1 | 58.76 |
| 27 | −2232.092 | (Variable) | | | 57.64 |
| 28 (Stop) | ∞ | 2.91 | | | 31.31 |
| 29 | −106.280 | 1.40 | 1.81600 | 46.6 | 30.12 |
| 30 | 34.710 | 0.20 | | | 28.96 |
| 31 | 31.646 | 6.16 | 1.80809 | 22.8 | 29.20 |
| 32 | 734.917 | 5.53 | | | 28.50 |
| 33 | −72.897 | 1.40 | 1.88300 | 40.8 | 26.66 |
| 34 | 140.432 | 22.72 | | | 26.50 |
| 35 | −90.869 | 1.80 | 1.64000 | 60.1 | 28.11 |
| 36 | 194.274 | 2.92 | 1.84666 | 23.8 | 28.69 |
| 37 | 159.905 | 3.03 | | | 29.09 |
| 38 | 1087.633 | 6.23 | 1.48749 | 70.2 | 30.11 |
| 39 | −47.445 | 0.20 | | | 31.04 |
| 40 | −169.196 | 1.60 | 1.88300 | 40.8 | 31.16 |
| 41 | 54.346 | 9.62 | 1.49700 | 81.5 | 31.72 |
| 42 | −39.224 | 0.20 | | | 32.87 |
| 43 | 1288.478 | 7.48 | 1.54814 | 45.8 | 32.98 |
| 44 | −37.788 | 1.60 | 1.88300 | 40.8 | 33.01 |
| 45 | −92.434 | 0.20 | | | 33.69 |
| 46 | 54.608 | 9.80 | 1.48749 | 70.2 | 33.73 |
| 47 | −69.816 | 14.00 | | | 32.68 |
| 48 | ∞ | 33.00 | 1.60859 | 46.4 | 60.00 |
| 49 | ∞ | 13.20 | 1.51633 | 64.2 | 60.00 |
| 50 | ∞ | (BF) | | | 60.00 |
| Image plane | ∞ | | | | |

Aspherical Surface data

Eleventh surface

K = −4.15562e+006  A4 = 9.64938e−007  A6 = −2.11065e−010
A8 = 4.00855e−013

Nineteenth surface

K = −7.63858e+001  A4 = 1.91972e−007  A6 = 2.39994e−011
A8 = 3.29461e−016

Twenty-fifth surface

K = 2.26047e+000  A4 = −9.56035e−008  A6 = −2.25528e−011
A8 = 1.13017e−014

Various data
Zoom ratio 115.00

| | Wide angle | Intermidiate | Telephoto |
|---|---|---|---|
| Focal length | 8.90 | 90.00 | 1024.50 |
| F-number | 1.80 | 1.80 | 5.30 |
| Half angle of field | 31.72 | 3.49 | 0.31 |
| Image height | 5.50 | 5.50 | 5.50 |
| Total lens length | 636.89 | 636.89 | 636.89 |
| BF | 12.00 | 12.00 | 12.00 |
| d10 | 2.74 | 152.94 | 199.14 |
| d17 | 280.68 | 104.25 | 2.00 |
| d24 | 1.15 | 4.95 | 83.43 |
| d27 | 3.00 | 25.42 | 3.00 |
| Entrance pupil position | 136.55 | 1028.47 | 15444.88 |
| Exit pupil position | 151.11 | 151.11 | 151.11 |
| Front principal point position | 146.02 | 1176.84 | 23998.24 |
| Rear principal point position | 3.10 | −78.06 | −1011.47 |

-continued

Unit: mm

Zoom lens unit data

| Unit | Leading surface | Focal length | Lens structure length | Front principal point position | Rear principal point position |
|---|---|---|---|---|---|
| 1 | 1 | 260.74 | 116.84 | 67.49 | −18.81 |
| 2 | 11 | −26.63 | 26.08 | 8.33 | −8.15 |
| 3 | 18 | 77.31 | 37.65 | 6.15 | −18.81 |
| 4 | 25 | 240.15 | 11.56 | 0.32 | −6.69 |
| 5 | 28 | 39.14 | 145.20 | 55.23 | 16.79 |

Single lens data

| Lens | Leading surface | Focal length |
|---|---|---|
| 1 | 1 | −433.30 |
| 2 | 3 | 513.40 |
| 3 | 5 | 687.63 |
| 4 | 7 | 670.18 |
| 5 | 9 | 887.02 |
| 6 | 11 | −68.57 |
| 7 | 13 | −37.97 |
| 8 | 14 | 33.22 |
| 9 | 16 | −41.77 |
| 10 | 18 | 182.51 |
| 11 | 20 | 146.26 |
| 12 | 22 | −142.21 |
| 13 | 23 | 124.48 |
| 14 | 25 | −320.02 |
| 15 | 26 | 136.07 |
| 16 | 29 | −31.76 |
| 17 | 31 | 40.35 |
| 18 | 33 | −53.86 |
| 19 | 35 | −96.12 |
| 20 | 36 | −1100.24 |
| 21 | 38 | 93.11 |
| 22 | 40 | −46.16 |
| 23 | 41 | 47.32 |
| 24 | 43 | 66.76 |
| 25 | 44 | −72.97 |
| 26 | 46 | 64.31 |

[Numerical Embodiment 5]

Unit: mm

Surface data

| Surface number | r | d | nd | vd | Effective diameter |
|---|---|---|---|---|---|
| 1 | 1300.941 | 6.00 | 1.83400 | 37.2 | 217.60 |
| 2 | 291.045 | 2.42 | | | 205.10 |
| 3 | 297.351 | 27.47 | 1.43387 | 95.1 | 204.17 |
| 4 | −916.326 | 26.45 | | | 201.96 |
| 5 | 304.176 | 19.64 | 1.43387 | 95.1 | 196.87 |
| 6 | −64063.025 | 0.25 | | | 196.37 |
| 7 | 256.190 | 20.10 | 1.43387 | 95.1 | 192.07 |
| 8 | 2748.569 | 1.20 | | | 190.85 |
| 9 | 215.536 | 14.00 | 1.43875 | 94.9 | 180.28 |
| 10 | 463.858 | (Variable) | | | 178.37 |
| 11* | 16820.626 | 2.20 | 2.00330 | 28.3 | 55.11 |
| 12 | 103.287 | 7.07 | | | 50.45 |
| 13 | −112.525 | 1.40 | 1.88300 | 40.8 | 48.01 |
| 14 | 44.393 | 9.02 | 1.95906 | 17.5 | 43.50 |
| 15 | −227.604 | 3.63 | | | 42.35 |
| 16 | −63.966 | 1.60 | 1.88300 | 40.8 | 40.50 |
| 17 | 84.986 | (Variable) | | | 38.82 |
| 18 | 146.306 | 11.55 | 1.55332 | 71.7 | 76.85 |
| 19* | −162.830 | 0.50 | | | 77.26 |
| 20 | 120.278 | 10.56 | 1.59282 | 68.6 | 77.99 |
| 21 | −465.328 | 0.20 | | | 77.48 |
| 22 | 113.681 | 2.50 | 1.84666 | 23.8 | 73.89 |
| 23 | 54.340 | 15.45 | 1.43875 | 94.9 | 69.05 |
| 24 | −93823.566 | (Variable) | | | 68.18 |
| 25* | 159.441 | 8.49 | 1.59551 | 39.2 | 65.84 |
| 26 | 7631.673 | (Variable) | | | 63.73 |
| 27 (Stop) | ∞ | 3.81 | | | 32.64 |
| 28 | −65.634 | 1.40 | 1.81600 | 46.6 | 31.35 |
| 29 | 38.490 | 0.20 | | | 30.60 |
| 30 | 36.274 | 6.01 | 1.80809 | 22.8 | 30.86 |
| 31 | −550.522 | 4.81 | | | 30.51 |
| 32 | −101.638 | 1.40 | 1.88300 | 40.8 | 29.26 |
| 33 | −478.263 | 1.99 | | | 29.20 |
| 34 | −173.501 | 1.80 | 1.75500 | 52.3 | 29.03 |
| 35 | 110.372 | 2.83 | 1.84666 | 23.8 | 29.07 |
| 36 | 204.004 | 3.03 | | | 29.06 |
| 37 | ∞ | 13.39 | 1.62041 | 60.3 | 29.36 |
| 38 | 90.490 | 5.92 | | | 30.43 |
| 39 | −989.776 | 5.43 | 1.48749 | 70.2 | 31.96 |
| 40 | −40.759 | 0.20 | | | 32.48 |
| 41 | −125.869 | 1.60 | 1.88300 | 40.8 | 32.32 |
| 42 | 41.430 | 9.89 | 1.49700 | 81.5 | 32.84 |
| 43 | −34.517 | 0.20 | | | 33.59 |
| 44 | 88.728 | 10.84 | 1.56732 | 42.8 | 33.52 |
| 45 | −30.080 | 1.60 | 1.88300 | 40.8 | 32.88 |
| 46 | −1248.023 | 0.20 | | | 33.52 |
| 47 | 81.277 | 8.44 | 1.48749 | 70.2 | 33.87 |
| 48 | −38.832 | 14.00 | | | 33.78 |
| 49 | ∞ | 33.00 | 1.60859 | 46.4 | 60.00 |
| 50 | ∞ | 13.20 | 1.51633 | 64.2 | 60.00 |
| 51 | ∞ | (BF) | | | 60.00 |
| Image plane | ∞ | | | | |

Aspherical Surface data

Eleventh surface $K = -4.15562e+006$   $A4 = 1.29729e-006$   $A6 = -1.70902e-010$
$A8 = 4.37596e-013$   $A10 = 2.88303e-017$ Nineteenth surface $K = -1.17434e+001$   $A4 = -8.13611e-008$   $A6 = 2.78100e-011$
$A8 = 2.24605e-014$   $A10 = -8.30743e-018$ Twenty-fifth surface $K = 1.38954e+000$   $A4 = -2.04062e-008$   $A6 = -1.14741e-010$
$A8 = 1.15408e-013$   $A10 = -4.62148e-017$ Various data
Zoom ratio 135.00

| | Wide angle | Intermidiate | Telephoto |
|---|---|---|---|
| Focal length | 8.80 | 85.00 | 1188.00 |
| F-number | 1.80 | 1.80 | 6.16 |
| Half angle of field | 32.01 | 3.70 | 0.27 |
| Image height | 5.50 | 5.50 | 5.50 |
| Total lens length | 642.61 | 642.61 | 642.61 |
| BF | 12.05 | 12.05 | 12.05 |
| d10 | 2.64 | 148.46 | 194.50 |
| d17 | 287.03 | 114.22 | 1.99 |
| d24 | 1.02 | 6.34 | 36.45 |
| d26 | 3.00 | 24.67 | 60.75 |
| Entrance pupil position | 140.80 | 1009.00 | 17365.10 |
| Exit pupil position | 378.26 | 378.26 | 378.26 |
| Front principal point position | 149.82 | 1113.73 | 22407.00 |
| Rear principal point position | 3.25 | −72.95 | −1175.95 |

-continued

Unit: mm

Zoom lens unit data

| Unit | Leading surface | Focal length | Lens structure length | Front principal point position | Rear principal point position |
|---|---|---|---|---|---|
| 1 | 1 | 259.83 | 117.52 | 66.93 | −21.05 |
| 2 | 11 | −24.69 | 24.92 | 10.77 | −5.42 |
| 3 | 18 | 76.13 | 40.76 | 5.52 | −21.36 |
| 4 | 25 | 271.69 | 8.49 | −0.11 | −5.42 |
| 5 | 27 | 50.30 | 145.20 | 58.52 | 20.02 |

Single lens data

| Lens | Leading surface | Focal length |
|---|---|---|
| 1 | 1 | −447.91 |
| 2 | 3 | 519.71 |
| 3 | 5 | 696.08 |
| 4 | 7 | 647.96 |
| 5 | 9 | 899.84 |
| 6 | 11 | −103.13 |
| 7 | 13 | −35.69 |
| 8 | 14 | 38.86 |
| 9 | 16 | −40.89 |
| 10 | 18 | 140.69 |
| 11 | 20 | 161.75 |
| 12 | 22 | −124.16 |
| 13 | 23 | 123.48 |
| 14 | 25 | 271.69 |
| 15 | 28 | −29.40 |
| 16 | 30 | 41.88 |
| 17 | 32 | −145.58 |
| 18 | 34 | −88.70 |
| 19 | 35 | 277.38 |
| 20 | 37 | −145.28 |
| 21 | 39 | 86.74 |
| 22 | 41 | −34.94 |
| 23 | 42 | 39.49 |
| 24 | 44 | 40.73 |
| 25 | 45 | −34.73 |
| 26 | 47 | 54.99 |

[Numerical Embodiment 6]

Unit: mm

Surface data

| Surface number | r | d | nd | vd | Effective diameter |
|---|---|---|---|---|---|
| 1 | 18038.086 | 6.00 | 1.83400 | 37.2 | 203.90 |
| 2 | 342.554 | 2.21 | | | 195.94 |
| 3 | 347.445 | 27.44 | 1.43387 | 95.1 | 195.67 |
| 4 | −499.176 | 26.19 | | | 194.62 |
| 5 | 325.077 | 17.73 | 1.43387 | 95.1 | 197.74 |
| 6 | 5634.881 | 0.25 | | | 197.26 |
| 7 | 258.904 | 20.76 | 1.43387 | 95.1 | 193.65 |
| 8 | 4202.299 | 1.20 | | | 192.48 |
| 9 | 210.198 | 14.00 | 1.49700 | 81.5 | 181.51 |
| 10 | 414.167 | (Variable) | | | 179.36 |
| 11* | 17543.108 | 2.20 | 2.00330 | 28.3 | 52.13 |
| 12 | 92.815 | 6.86 | | | 47.67 |
| 13 | −108.038 | 1.40 | 1.88300 | 40.8 | 45.76 |
| 14 | 50.682 | 7.40 | 1.95906 | 17.5 | 42.41 |
| 15 | −221.450 | 3.18 | | | 41.67 |
| 16 | −62.429 | 1.60 | 1.75500 | 52.3 | 40.82 |
| 17 | 82.841 | (Variable) | | | 39.16 |
| 18 | 164.117 | 12.68 | 1.59240 | 68.3 | 78.40 |
| 19* | −122.176 | 0.50 | | | 78.78 |
| 20 | 121.814 | 7.68 | 1.59282 | 68.6 | 78.50 |
| 21 | 606.634 | 0.20 | | | 77.86 |
| 22 | 122.771 | 2.50 | 1.84666 | 23.8 | 76.13 |
| 23 | 63.969 | 14.11 | 1.43875 | 94.9 | 72.40 |
| 24 | 3015.157 | (Variable) | | | 71.62 |
| 25* | 171.034 | 3.50 | 1.66680 | 33.0 | 68.34 |
| 26 | 95.139 | 0.21 | | | 66.11 |
| 27 | 98.146 | 9.36 | 1.64000 | 60.1 | 66.11 |
| 28 | −675.791 | (Variable) | | | 65.11 |
| 29 (Stop) | ∞ | 3.31 | | | 31.79 |
| 30 | −81.931 | 1.40 | 1.81600 | 46.6 | 30.54 |
| 31 | 33.583 | 0.20 | | | 29.48 |
| 32 | 33.682 | 6.02 | 1.80809 | 22.8 | 29.60 |
| 33 | 3707.619 | 5.24 | | | 29.16 |
| 34 | −84.153 | 1.40 | 1.88300 | 40.8 | 27.94 |
| 35 | 555.793 | 27.73 | | | 27.94 |
| 36 | −177.582 | 1.80 | 1.75500 | 52.3 | 29.28 |
| 37 | 108.778 | 2.84 | 1.84666 | 23.8 | 29.62 |
| 38 | 97.497 | 3.03 | | | 29.86 |
| 39 | 1212.081 | 6.79 | 1.48749 | 70.2 | 30.71 |
| 40 | −38.480 | 0.20 | | | 31.62 |
| 41 | −348.818 | 1.60 | 1.88300 | 40.8 | 31.55 |
| 42 | 48.776 | 8.71 | 1.49700 | 81.5 | 31.70 |
| 43 | −53.620 | 0.20 | | | 32.50 |
| 44 | 1020.319 | 8.29 | 1.56732 | 42.8 | 32.56 |
| 45 | −31.299 | 1.60 | 1.88300 | 40.8 | 32.57 |
| 46 | −85.990 | 0.20 | | | 33.48 |
| 47 | 82.479 | 7.89 | 1.48749 | 70.2 | 33.60 |
| 48 | −48.408 | 14.00 | | | 33.58 |
| 49 | ∞ | 33.00 | 1.60859 | 46.4 | 60.00 |
| 50 | ∞ | 13.20 | 1.51633 | 64.2 | 60.00 |
| 51 | ∞ | (BF) | | | 60.00 |
| Image plane | ∞ | | | | |

Aspherical Surface data

Eleventh surface

K = −4.15562e+006  A4 = 1.19348e−006  A6 = −1.02612e−010
A8 = 3.61444e−013

Nineteenth surface

K = −5.14987e+000  A4 = −1.42395e−007  A6 = 3.56009e−011
A8 = −2.80215e−015

Twenty-fifth surface

K = 2.56737e+000  A4 = −8.50439e−008  A6 = −3.35634e−011
A8 = 1.62886e−015

Various data
Zoom ratio 120.00

| | Wide angle | Intermidiate | Telephoto |
|---|---|---|---|
| Focal length | 9.00 | 90.00 | 1080.00 |
| F-number | 1.80 | 1.80 | 5.60 |
| Half angle of field | 31.43 | 3.50 | 0.29 |
| Image height | 5.50 | 5.50 | 5.50 |
| Total lens length | 643.67 | 643.67 | 643.67 |
| BF | 11.99 | 11.99 | 11.99 |
| d10 | 2.67 | 148.22 | 194.19 |
| d17 | 286.72 | 107.71 | 1.98 |
| d24 | 1.50 | 14.45 | 13.50 |
| d28 | 3.00 | 23.51 | 84.22 |
| Entrance pupil position | 135.91 | 961.78 | 14621.12 |
| Exit pupil position | 142.08 | 142.08 | 142.08 |
| Front principal point position | 145.53 | 1114.04 | 24666.86 |
| Rear principal point position | 2.99 | −78.01 | −1068.01 |

-continued

Unit: mm

Zoom lens unit data

| Unit | Leading surface | Focal length | Lens structure length | Front principal point position | Rear principal point position |
|---|---|---|---|---|---|
| 1 | 1 | 258.98 | 115.79 | 67.05 | −18.24 |
| 2 | 11 | −25.96 | 22.64 | 9.31 | −5.75 |
| 3 | 18 | 78.97 | 37.66 | 4.95 | −19.62 |
| 4 | 25 | 230.00 | 13.06 | 1.82 | −6.23 |
| 5 | 29 | 38.54 | 148.65 | 55.89 | 17.86 |

Single lens data

| Lens | Leading surface | Focal length |
|---|---|---|
| 1 | 1 | −416.10 |
| 2 | 3 | 475.65 |
| 3 | 5 | 792.33 |
| 4 | 7 | 633.31 |
| 5 | 9 | 837.16 |
| 6 | 11 | −92.24 |
| 7 | 13 | −38.68 |
| 8 | 14 | 43.01 |
| 9 | 16 | −46.72 |
| 10 | 18 | 119.79 |
| 11 | 20 | 254.71 |
| 12 | 22 | −159.32 |
| 13 | 23 | 148.37 |
| 14 | 25 | −325.28 |
| 15 | 27 | 134.01 |
| 16 | 30 | −28.88 |
| 17 | 32 | 41.60 |
| 18 | 34 | −82.21 |
| 19 | 36 | −88.70 |
| 20 | 37 | −1244.08 |
| 21 | 39 | 76.38 |
| 22 | 41 | −48.09 |
| 23 | 42 | 52.73 |
| 24 | 44 | 53.39 |
| 25 | 45 | −56.18 |
| 26 | 47 | 63.62 |
| 27 | 49 | 0.00 |
| 28 | 50 | 0.00 |

[Numerical Embodiment 7]

Unit: mm

Surface data

| Surface number | r | d | nd | vd | Effective diameter |
|---|---|---|---|---|---|
| 1 | 367.273 | 5.35 | 1.77250 | 49.6 | 174.04 |
| 2 | 103.630 | 48.44 | | | 146.46 |
| 3 | −172.586 | 4.40 | 1.69680 | 55.5 | 145.32 |
| 4 | 661.258 | 0.09 | | | 147.62 |
| 5 | 252.609 | 11.18 | 1.80518 | 25.4 | 149.98 |
| 6 | 1073.304 | 6.46 | | | 149.72 |
| 7 | 6108.371 | 18.99 | 1.43387 | 95.1 | 149.38 |
| 8 | −186.138 | 0.10 | | | 149.19 |
| 9 | −4069.943 | 4.20 | 1.72047 | 34.7 | 141.43 |
| 10 | 247.894 | 18.79 | 1.49700 | 81.5 | 137.42 |
| 11 | −360.414 | 26.25 | | | 136.83 |
| 12 | 707.021 | 19.58 | 1.43387 | 95.1 | 144.90 |
| 13 | −214.457 | 1.58 | | | 145.54 |
| 14 | 168.148 | 4.30 | 1.75520 | 27.5 | 145.04 |
| 15 | 114.254 | 0.87 | | | 140.15 |
| 16 | 117.649 | 28.12 | 1.49700 | 81.5 | 140.16 |
| 17 | −2493.992 | 0.08 | | | 139.33 |
| 18 | 152.682 | 14.72 | 1.62041 | 60.3 | 133.70 |
| 19 | 711.234 | (Variable) | | | 132.33 |
| 20* | 437.403 | 2.50 | 1.77250 | 49.6 | 53.73 |
| 21 | 44.690 | 4.02 | | | 46.24 |
| 22 | 62.673 | 9.85 | 1.80809 | 22.8 | 44.94 |
| 23 | −70.154 | 1.50 | 1.75500 | 52.3 | 43.22 |
| 24 | 51.480 | 7.41 | | | 36.64 |
| 25 | −44.364 | 1.50 | 1.88300 | 40.8 | 36.63 |
| 26 | −191.122 | (Variable) | | | 38.21 |
| 27 | 107.302 | 7.68 | 1.59282 | 68.6 | 50.48 |
| 28* | −111.966 | 0.10 | | | 50.70 |
| 29 | 148.736 | 8.09 | 1.43875 | 94.9 | 50.44 |
| 30 | −82.690 | 0.61 | | | 50.15 |
| 31 | −93.102 | 1.90 | 1.84666 | 23.8 | 49.56 |
| 32 | −826.008 | 4.39 | 1.43875 | 94.9 | 49.53 |
| 33 | −112.173 | (Variable) | | | 49.48 |
| 34* | 215.874 | 5.21 | 1.59282 | 68.6 | 45.76 |
| 35 | −165.358 | (Variable) | | | 45.21 |
| 36 (Stop) | ∞ | 2.67 | | | 29.49 |
| 37 | −65.511 | 1.50 | 1.69680 | 55.5 | 28.91 |
| 38 | 27.094 | 6.11 | 1.80809 | 22.8 | 28.09 |
| 39 | 55.265 | 22.99 | | | 27.37 |
| 40 | −102.984 | 1.50 | 1.77250 | 49.6 | 28.97 |
| 41 | 35.101 | 10.94 | 1.60342 | 38.0 | 29.96 |
| 42 | −29.630 | 0.20 | | | 30.91 |
| 43 | −31.078 | 1.60 | 1.81600 | 46.6 | 30.79 |
| 44 | 98.616 | 12.85 | 1.59551 | 39.2 | 33.36 |
| 45 | −47.974 | 3.00 | | | 36.97 |
| 46 | −1196.825 | 5.47 | 1.53172 | 48.8 | 38.66 |
| 47 | −74.286 | 0.20 | | | 39.20 |
| 48 | 234.171 | 2.00 | 1.88300 | 40.8 | 39.14 |
| 49 | 39.291 | 10.31 | 1.49700 | 81.5 | 38.60 |
| 50 | −105.835 | 0.81 | | | 39.24 |
| 51 | 94.775 | 9.45 | 1.49700 | 81.5 | 39.69 |
| 52 | −60.453 | 2.00 | 1.76182 | 26.5 | 39.37 |
| 53 | −380.731 | 0.20 | | | 39.55 |
| 54 | 99.287 | 9.90 | 1.48749 | 70.2 | 39.52 |
| 55 | −51.883 | 13.04 | | | 38.94 |
| 56 | ∞ | 33.00 | 1.60859 | 46.4 | 50.00 |
| 57 | ∞ | 13.20 | 1.51633 | 64.2 | 50.00 |
| 58 | ∞ | (BF) | | | 50.00 |
| Image plane | ∞ | | | | |

Aspherical Surface data

Twentieth surface

K = −1.87877e+002　　A4 = 6.84455e−007　　A6 = −6.25050e−011
A8 = −1.31670e−013

Twenty-eighth surface

K = −1.07578e+000　　A4 = 5.78026e−007　　A6 = −8.77281e−011
A8 = 6.21590e−014

Thirty-fourth surface

K = 1.50536e+001　　A4 = −4.06447e−007　　A6 = −3.78830e−010
A8 = 2.01115e−013

Various data
Zoom ratio 28.00

| | Wide angle | Intermidiate | Telephoto |
|---|---|---|---|
| Focal length | 6.75 | 35.00 | 189.00 |
| F-number | 1.55 | 1.55 | 2.30 |
| Half angle of field | 39.17 | 8.93 | 1.67 |
| Image height | 5.50 | 5.50 | 5.50 |
| Total lens length | 610.04 | 610.04 | 610.04 |
| BF | 12.06 | 12.06 | 12.06 |

-continued

Unit: mm

| | | | |
|---|---|---|---|
| d19 | 2.00 | 74.41 | 108.48 |
| d26 | 161.24 | 69.11 | 1.25 |
| d33 | 1.55 | 3.67 | 24.34 |
| d35 | 2.00 | 19.60 | 32.71 |
| Entrance pupil position | 110.00 | 230.90 | 902.44 |
| Exit pupil position | 83.72 | 83.72 | 83.72 |
| Front principal point position | 117.39 | 283.00 | 1589.90 |
| Rear principal point position | 5.31 | −22.94 | −176.94 |

Zoom lens unit data

| Unit | Leading surface | Focal length | Lens structure length | Front principal point position | Rear principal point position |
|---|---|---|---|---|---|
| 1 | 1 | 103.72 | 213.50 | 126.84 | 58.96 |
| 2 | 20 | −28.72 | 26.78 | 11.80 | −6.48 |
| 3 | 27 | 71.58 | 22.77 | 4.27 | −11.34 |
| 4 | 34 | 158.21 | 5.21 | 1.86 | −1.42 |
| 5 | 36 | 30.08 | 162.94 | 49.42 | 6.84 |

Single lens data

| Lens | Leading surface | Focal length |
|---|---|---|
| 1 | 1 | −187.65 |
| 2 | 3 | −195.16 |

-continued

Unit: mm

| | | |
|---|---|---|
| 3 | 5 | 404.06 |
| 4 | 7 | 415.67 |
| 5 | 9 | −321.99 |
| 6 | 10 | 297.72 |
| 7 | 12 | 380.75 |
| 8 | 14 | −484.73 |
| 9 | 16 | 226.21 |
| 10 | 18 | 309.01 |
| 11 | 20 | −64.31 |
| 12 | 22 | 41.94 |
| 13 | 23 | −38.94 |
| 14 | 25 | −65.37 |
| 15 | 27 | 93.32 |
| 16 | 29 | 122.13 |
| 17 | 31 | −122.87 |
| 18 | 32 | 294.54 |
| 19 | 34 | 158.21 |
| 20 | 37 | −27.21 |
| 21 | 38 | 59.32 |
| 22 | 40 | −33.57 |
| 23 | 41 | 28.27 |
| 24 | 43 | −28.65 |
| 25 | 44 | 55.70 |
| 26 | 46 | 147.98 |
| 27 | 48 | −53.42 |
| 28 | 49 | 58.88 |
| 29 | 51 | 75.58 |
| 30 | 52 | −93.76 |
| 31 | 54 | 71.20 |

TABLE 1

| | | Embodiment | | | | | | |
|---|---|---|---|---|---|---|---|---|
| | | 1 | 2 | 3 | 4 | 5 | 6 | 7 |
| | fw | 8.900 | 8.900 | 9.000 | 8.900 | 8.800 | 9.000 | 6.750 |
| | ft | 1023.500 | 890.000 | 1080.000 | 1023.500 | 1188.000 | 1080.000 | 189.000 |
| | β4w | 0.838 | 0.790 | 0.812 | 0.747 | 0.779 | 0.739 | 0.626 |
| | β4t | 0.796 | 0.612 | 0.657 | 0.747 | 0.566 | 0.386 | 0.432 |
| | β34w | −0.214 | −0.221 | −0.228 | −0.233 | −0.238 | −0.236 | −0.329 |
| | β34t | −1.142 | −1.226 | −1.321 | −1.029 | −1.410 | −1.573 | −1.050 |
| | m2 | 203.610 | 195.390 | 196.889 | 196.400 | 191.864 | 191.518 | 106.485 |
| | m3 | −71.636 | −71.904 | −82.581 | −82.277 | −93.176 | −93.222 | −53.504 |
| | f34w | 58.127 | 58.343 | 61.604 | 62.472 | 63.536 | 63.499 | 52.659 |
| | f34t | 69.529 | 64.280 | 68.297 | 86.391 | 71.295 | 66.280 | 58.902 |
| | f1 | 266.035 | 259.253 | 260.402 | 260.742 | 259.832 | 258.978 | 103.721 |
| | Z2 | 21.511 | 18.063 | 20.734 | 26.070 | 22.751 | 17.969 | 8.784 |
| | Z34 | 5.346 | 5.536 | 5.788 | 4.411 | 5.934 | 6.678 | 3.188 |
| Conditional Expression | | | | | | | | |
| (1) | LN(Z2)/LN(Z34) | 1.830 | 1.691 | 1.727 | 2.197 | 1.755 | 1.521 | 1.874 |
| (2) | f34w/f34t | 0.836 | 0.908 | 0.902 | 0.723 | 0.891 | 0.958 | 0.894 |
| (3) | |m2/m3| | 2.842 | 2.717 | 2.384 | 2.387 | 2.059 | 2.054 | 1.990 |
| (4) | β4t/β4w | 0.951 | 0.775 | 0.809 | 1.000 | 0.727 | 0.522 | 0.690 |
| (5) | ft/f1 | 3.947 | 3.433 | 4.147 | 3.925 | 4.572 | 4.170 | 1.822 |
| (6) | L34t/L34w | 76.260 | 123.136 | 175.970 | 72.779 | 35.864 | 9.000 | 15.710 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-228696, filed Oct. 16, 2012, which is hereby incorporated by reference herein in its entirety.

What is claimed is:

1. A zoom lens comprising, in order from an object side to an image side:
   a first lens unit having a positive refractive power, which does not move during zooming;
   a second lens unit having a negative refractive power, which moves during zooming;
   a third lens unit having a positive refractive power, which moves during zooming;
   a fourth lens unit having a positive refractive power, which moves during zooming; and
   a fifth lens unit having a positive refractive power, which does not move during zooming,
   wherein the third lens unit comprises at least one negative lens, and
   wherein the following conditional expressions are satisfied:

$1.50 < LN(Z2)/LN(Z34) \leq 1.874$; and $0.77 < f34w/f34t < 0.96$, where LN(Z2) is a natural logarithm of a value Z2 ($=\beta 2t/\beta 2w$) obtained by dividing a lateral magnification $\beta 2t$ of the second lens unit at a telephoto end by a lateral magnification $\beta 2w$ of the second lens unit at a wide angle end, LN(Z34) is a natural logarithm of a value Z34 ($=\beta 34t/\beta 34w$) obtained by dividing a combined lateral magnification $\beta 34t$ of the third lens unit and the fourth lens unit at the telephoto end by a combined lateral magnification $\beta 34w$ of the third lens unit and the fourth lens unit at the wide angle end, f34w is a combined focal length of the third lens unit and the fourth lens unit at the wide angle end, and f34t is a combined focal length of the third lens unit and the fourth lens unit at the telephoto end.

2. A zoom lens according to claim 1, wherein the following conditional expression is satisfied:

$1.90 < |m2/m3| < 3.00$, where m2 is a position of the second lens unit in an optical axis direction at the telephoto end with reference to the wide angle end, and m3 is a position of the third lens unit in an optical axis direction at the telephoto end with reference to the wide angle end.

3. A zoom lens according to claim 1, wherein the following conditional expression is satisfied:

$0.70 < \beta 4t/\beta 4w < 1.05$, where $\beta 4w$ is a lateral magnification of the fourth lens unit at the wide angle end, and $\beta 4t$ is a lateral magnification of the fourth lens unit at the telephoto end.

4. A zoom lens according to claim 1, wherein the following conditional expression is satisfied:

$3.30 < ft/f1 < 5.50$, where f1 is a focal length of the first lens unit, and ft is a focal length of an entire lens system at the telephoto end.

5. A zoom lens according to claim 1, wherein the following conditional expression is satisfied:

$1.00 < L34t/L34w < 200.00$, where L34w is an air interval between the third lens unit and the fourth lens unit at the wide angle end, and L34t is an air interval between the third lens unit and the fourth lens unit at the telephoto end.

6. A zoom lens according to claim 1, wherein the second lens unit comprises at least one positive lens.

7. A zoom lens according to claim 1, wherein the fourth lens unit comprises at least one negative lens.

8. A zoom lens according to claim 1, wherein the fourth lens unit consists of a positive single lens.

9. A zoom lens according to claim 1, wherein an interval between the second lens unit and the third lens unit at the wide angle end is larger than an interval between the third lens unit and the fourth lens unit at the wide angle end.

10. An image pickup apparatus comprising:
    a zoom lens; and
    a solid-state image pickup element for receiving an image formed by the zoom lens,
    wherein the zoom lens comprises, in order from an object side to an image side:
    a first lens unit having a positive refractive power, which does not move during zooming;
    a second lens unit having a negative refractive power, which moves during zooming;
    a third lens unit having a positive refractive power, which moves during zooming;
    a fourth lens unit having a positive refractive power, which moves during zooming; and
    a fifth lens unit having a positive refractive power, which does not move during zooming,
    wherein the third lens unit comprises at least one negative lens, and
    wherein the following conditional expressions are satisfied:

$1.50 < LN(Z2)/LN(Z34) \leq 1.874$; and $0.70 < f34w/f34t < 0.96$, where LN(Z2) is a natural logarithm of a value Z2 ($=\beta 2t/\beta 2w$) obtained by dividing a lateral magnification $\beta 2t$ of the second lens unit at a telephoto end by a lateral magnification $\beta 2w$ of the second lens unit at a wide angle end, LN(Z34) is a natural logarithm of a value Z34 ($=\beta 34t/\beta 34w$) obtained by dividing a combined lateral magnification $\beta 34t$ of the third lens unit and the fourth lens unit at the telephoto end by a combined lateral magnification $\beta 34w$ of the third lens unit and the fourth lens unit at the wide angle end, f34w is a combined focal length of the third lens unit and the fourth lens unit at the wide angle end, and f34t is a combined focal length of the third lens unit and the fourth lens unit at the telephoto end.

* * * * *